US009621700B2

(12) United States Patent
Narita et al.

(10) Patent No.: US 9,621,700 B2
(45) Date of Patent: Apr. 11, 2017

(54) MOBILE TERMINAL DEVICE

(71) Applicant: KYOCERA Corporation, Kyoto-shi, Kyoto (JP)

(72) Inventors: Masahiro Narita, Higashishirakawa-gun (JP); Yasuhiro Miki, Ikoma (JP); Toshikazu Kawauchi, Yokohama (JP); Tsuneyasu Inukai, Yokohama (JP); Toshiaki Nade, Yokohama (JP); Shinsuke Moriai, Daito (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/750,908

(22) Filed: Jun. 25, 2015

(65) Prior Publication Data
US 2015/0296065 A1    Oct. 15, 2015

Related U.S. Application Data

(63) Continuation of application No. PCT/JP2013/084541, filed on Dec. 24, 2013.

(30) Foreign Application Priority Data

Dec. 25, 2012  (JP) ................. 2012-281252
Dec. 25, 2012  (JP) ................. 2012-281255

(51) Int. Cl.
*H04M 1/725*    (2006.01)
*H04M 1/663*    (2006.01)
(Continued)

(52) U.S. Cl.
CPC ........... *H04M 1/64* (2013.01); *H04M 1/0206* (2013.01); *H04M 1/72519* (2013.01);
(Continued)

(58) Field of Classification Search
CPC ... H04M 1/64; H04M 2250/12; G06F 1/1626; G06F 3/044
(Continued)

(56) References Cited

U.S. PATENT DOCUMENTS 6,330,457 B1 * 12/2001 Yoon ................... H04M 1/0202
                                                                379/419
8,219,151 B2 *  7/2012 Park .................. H04M 1/72583
                                                                345/169

(Continued)

FOREIGN PATENT DOCUMENTS

JP    07-001876 Y2    1/1995
JP    2004-254337 A   9/2004
(Continued)

OTHER PUBLICATIONS

International Search Report dated Mar. 18, 2014, issued for International Application No. PCT/JP2013-084541.
(Continued)

*Primary Examiner* — Simon Nguyen
(74) *Attorney, Agent, or Firm* — Procopio Cory Hargreaves and Savitch LLP

(57) ABSTRACT

A mobile terminal device is disclosed. The device includes a display module, a communication module, a sound input module, a sound output module, a hold detection module and a control module. The communication module is configured to receive an incoming call. The sound input module is configured to receive sound from a user. The sound output module is configured to output sound of the call. The hold detection module is configured to detect that the mobile terminal device is held. The control module is configured to perform a process of notifying the caller that the user cannot take the call when the communication module receives an incoming call, the hold detection module detects that the
(Continued)

mobile terminal device is held and then the hold detection module detects that the mobile terminal device is not held.

20 Claims, 21 Drawing Sheets

(51) Int. Cl.
*H04M 1/64* (2006.01)
*H04M 1/02* (2006.01)
*H04W 88/02* (2009.01)

(52) U.S. Cl.
CPC .......... *H04W 88/02* (2013.01); *H04M 1/0202* (2013.01); *H04M 2201/38* (2013.01); *H04M 2250/12* (2013.01); *H04M 2250/22* (2013.01)

(58) Field of Classification Search
USPC ........... 455/412.1–413, 415–417, 466, 414.1
See application file for complete search history.

(56) References Cited

U.S. PATENT DOCUMENTS

| | | | |
|---|---|---|---|
| 2002/0167488 A1* | 11/2002 | Hinckley | G06F 1/1626 345/156 |
| 2005/0003793 A1 | 1/2005 | Goris et al. | |
| 2006/0176230 A1 | 8/2006 | Takakura | |
| 2007/0004470 A1 | 1/2007 | Goris et al. | |
| 2007/0037605 A1* | 2/2007 | Logan | G08B 13/1427 455/567 |
| 2008/0070639 A1 | 3/2008 | Goris et al. | |
| 2010/0151916 A1 | 6/2010 | Baek et al. | |
| 2010/0245265 A1 | 9/2010 | Sato et al. | |
| 2011/0304648 A1* | 12/2011 | Kim | G06F 1/1626 345/633 |
| 2011/0312349 A1* | 12/2011 | Forutanpour | G06F 1/1626 455/466 |
| 2012/0206556 A1* | 8/2012 | Yu | H04M 1/00 348/14.02 |
| 2012/0238327 A1 | 9/2012 | Goris et al. | |
| 2012/0249459 A1 | 10/2012 | Sashida et al. | |
| 2013/0038560 A1 | 2/2013 | Sato et al. | |
| 2013/0076688 A1* | 3/2013 | Tokutake | G06F 3/044 345/174 |
| 2013/0214905 A1 | 8/2013 | Ota et al. | |
| 2015/0005045 A1 | 1/2015 | Sato et al. | |

FOREIGN PATENT DOCUMENTS

| | | |
|---|---|---|
| JP | 2004-343287 A | 12/2004 |
| JP | 2005-012805 A | 1/2005 |
| JP | 2006-214770 A | 8/2006 |
| JP | 2007-080219 A | 3/2007 |
| JP | 2010-022043 A | 1/2010 |
| JP | 2010-147656 A | 7/2010 |
| JP | 2010-154090 A | 7/2010 |
| JP | 2010-239211 A | 10/2010 |
| JP | 2010-258647 A | 11/2010 |
| JP | 2011-139258 A | 7/2011 |
| JP | 2011-211859 A | 10/2011 |
| JP | 2012-156662 A | 8/2012 |
| JP | 2012-169912 A | 9/2012 |
| JP | 2012-186766 A | 9/2012 |
| JP | 2012-203895 A | 10/2012 |
| WO | 2011/069926 A2 | 6/2011 |
| WO | 2012/031965 A1 | 3/2012 |
| WO | 2012/141288 A1 | 10/2012 |
| WO | 2012/160820 A1 | 11/2012 |

OTHER PUBLICATIONS

Written Opinion of the International Searching Authority issued by Japan Patent Office for International Application No. PCT/JP2013/084541.
Written Opinion of the International Searching Authority issued by Japan Patent Office for International Application No. PCT/JP2013/084541.
Office Action dated Oct. 18, 2016 issued by Japanese Patent Office for corresponding Japanese Patent Application No. 2012-281255, with concise explanation.
Office Action dated Dec. 13, 2016 issued by Japan Patent Office for corresponding Japanese Patent Application No. 2012-281252, 5 pgs.

* cited by examiner

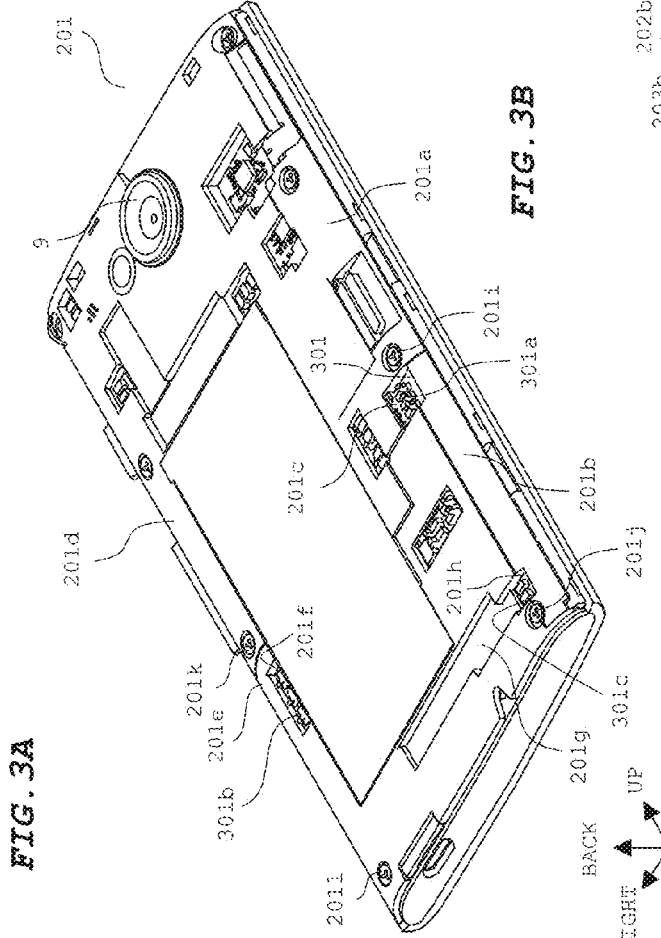
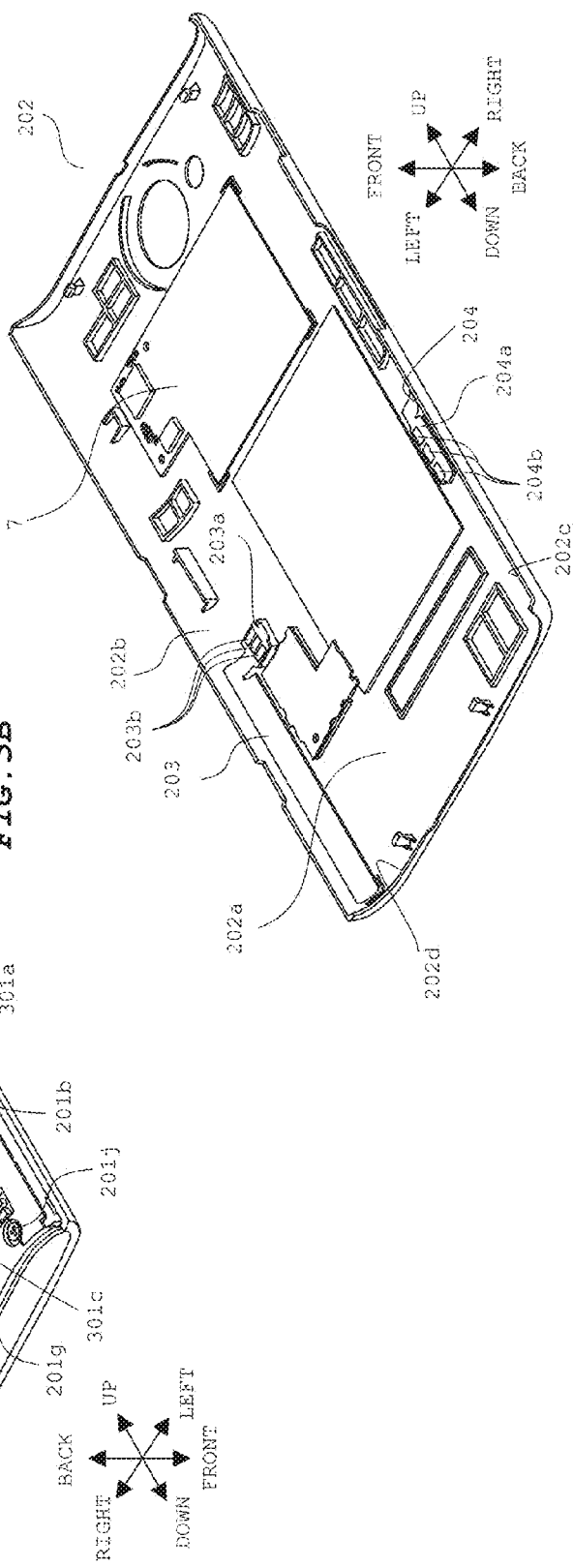
FIG. 3A
FIG. 3B

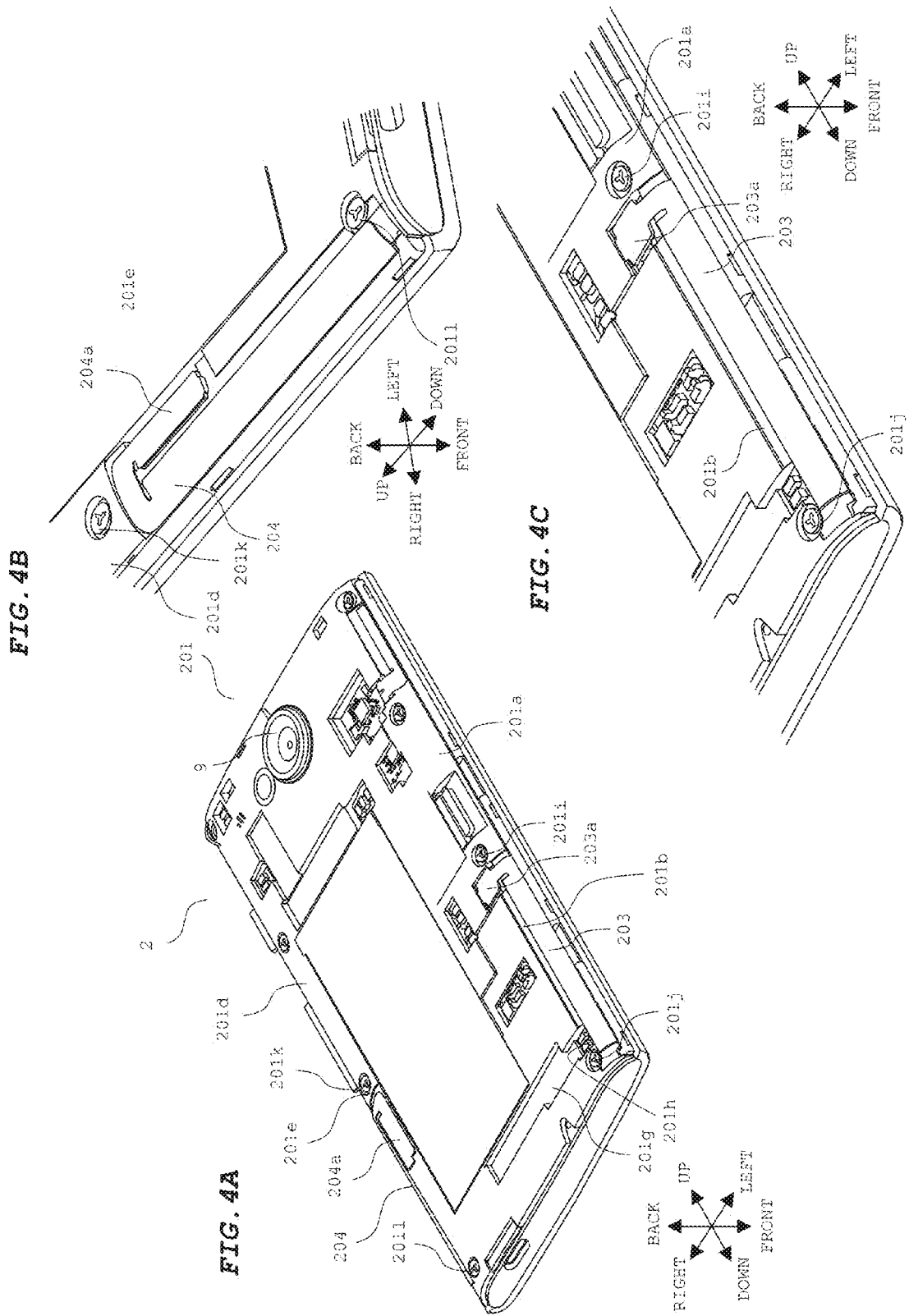

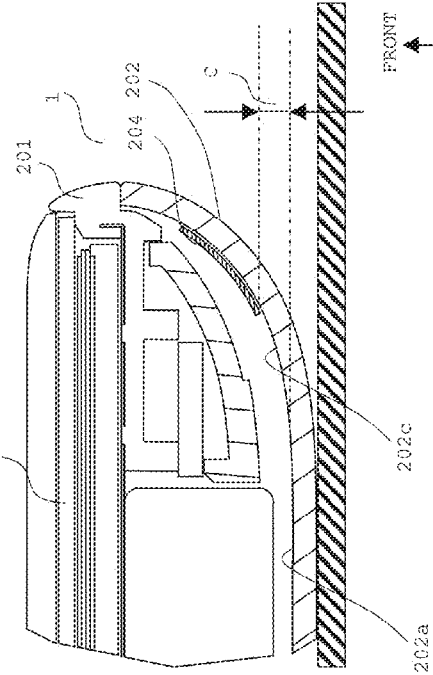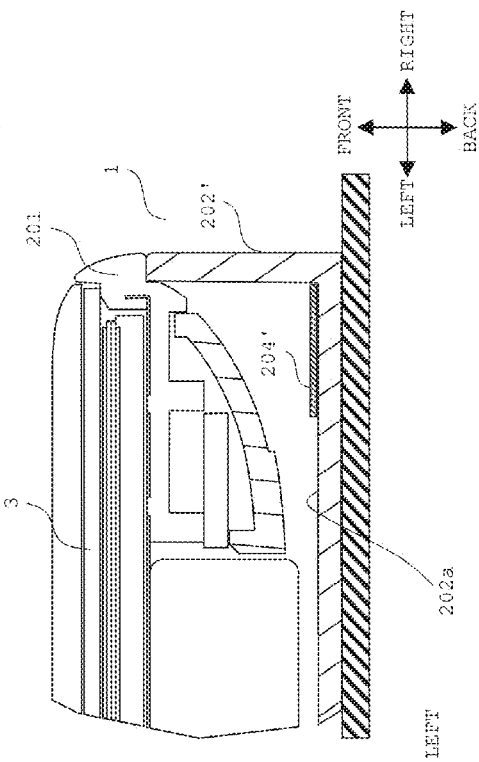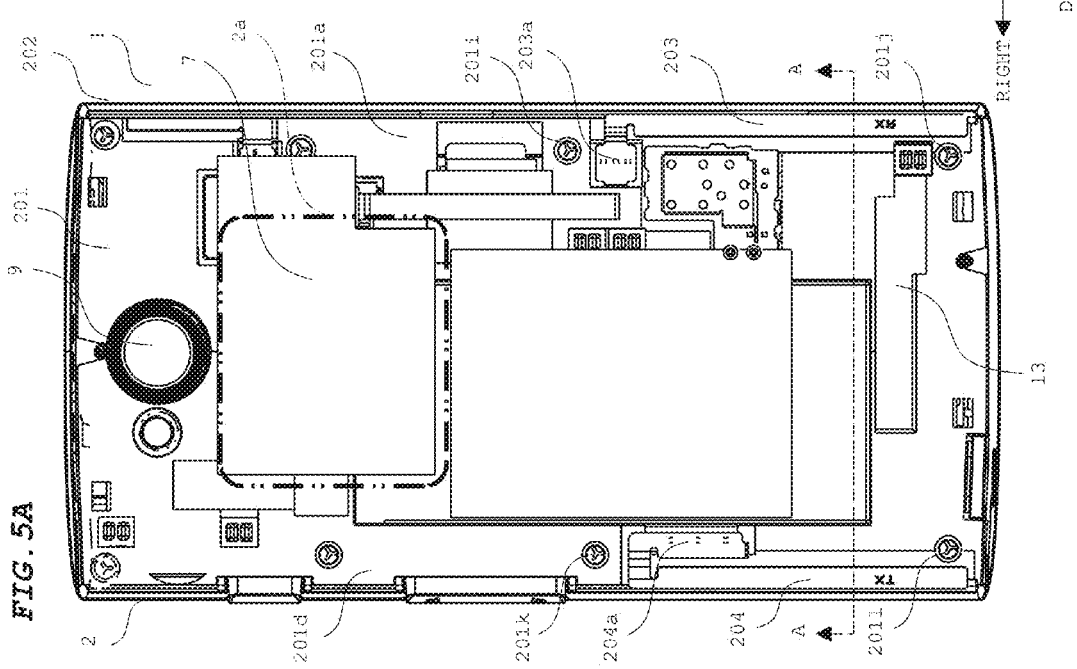

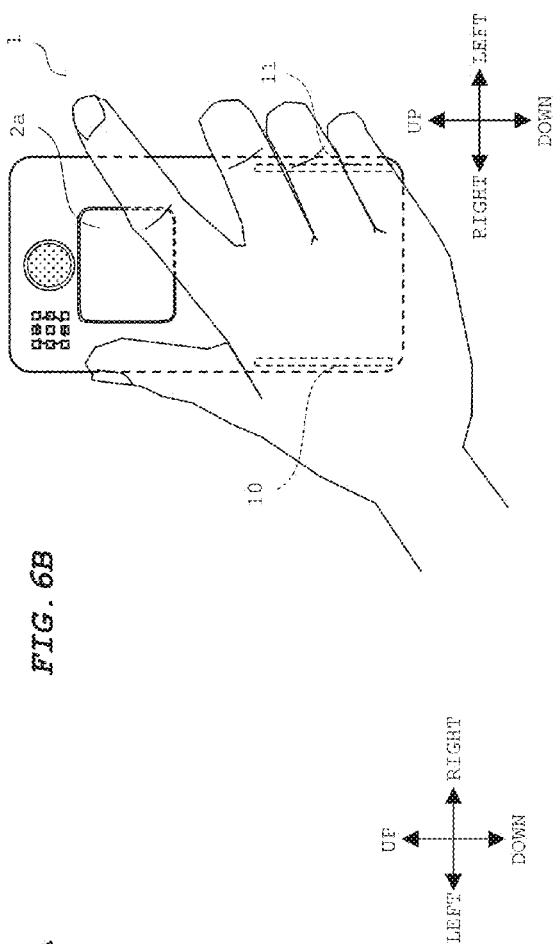
FIG. 6A
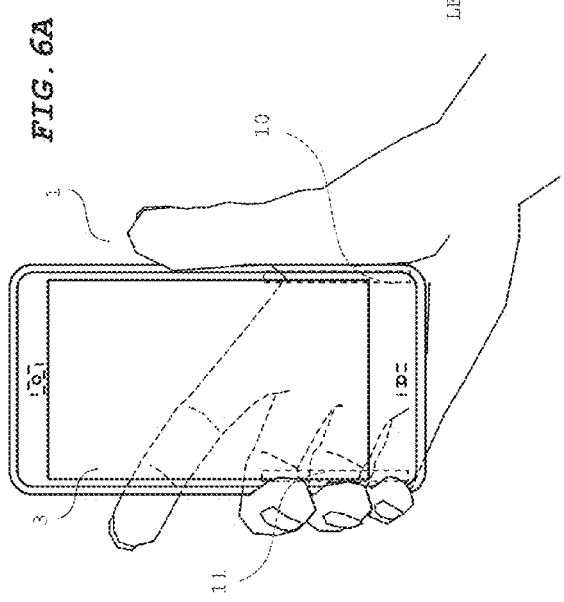
FIG. 6C
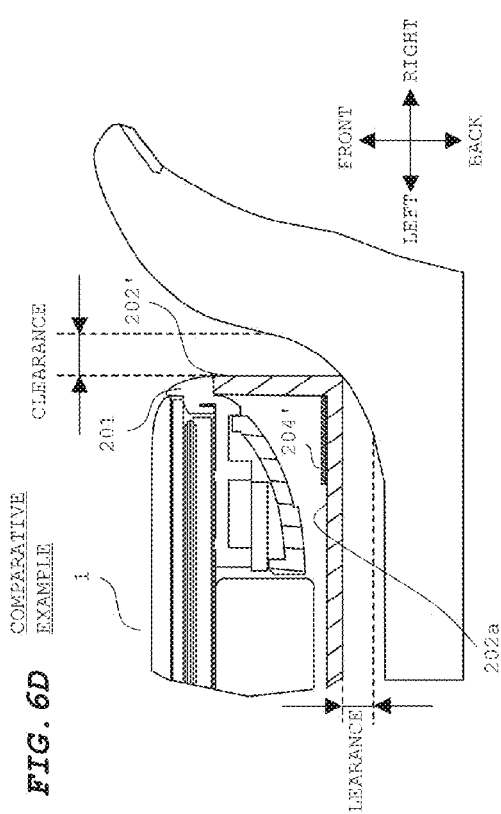
FIG. 6B
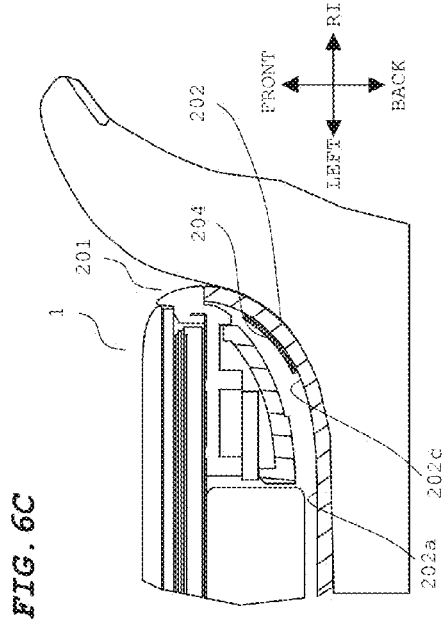
FIG. 6D COMPARATIVE EXAMPLE

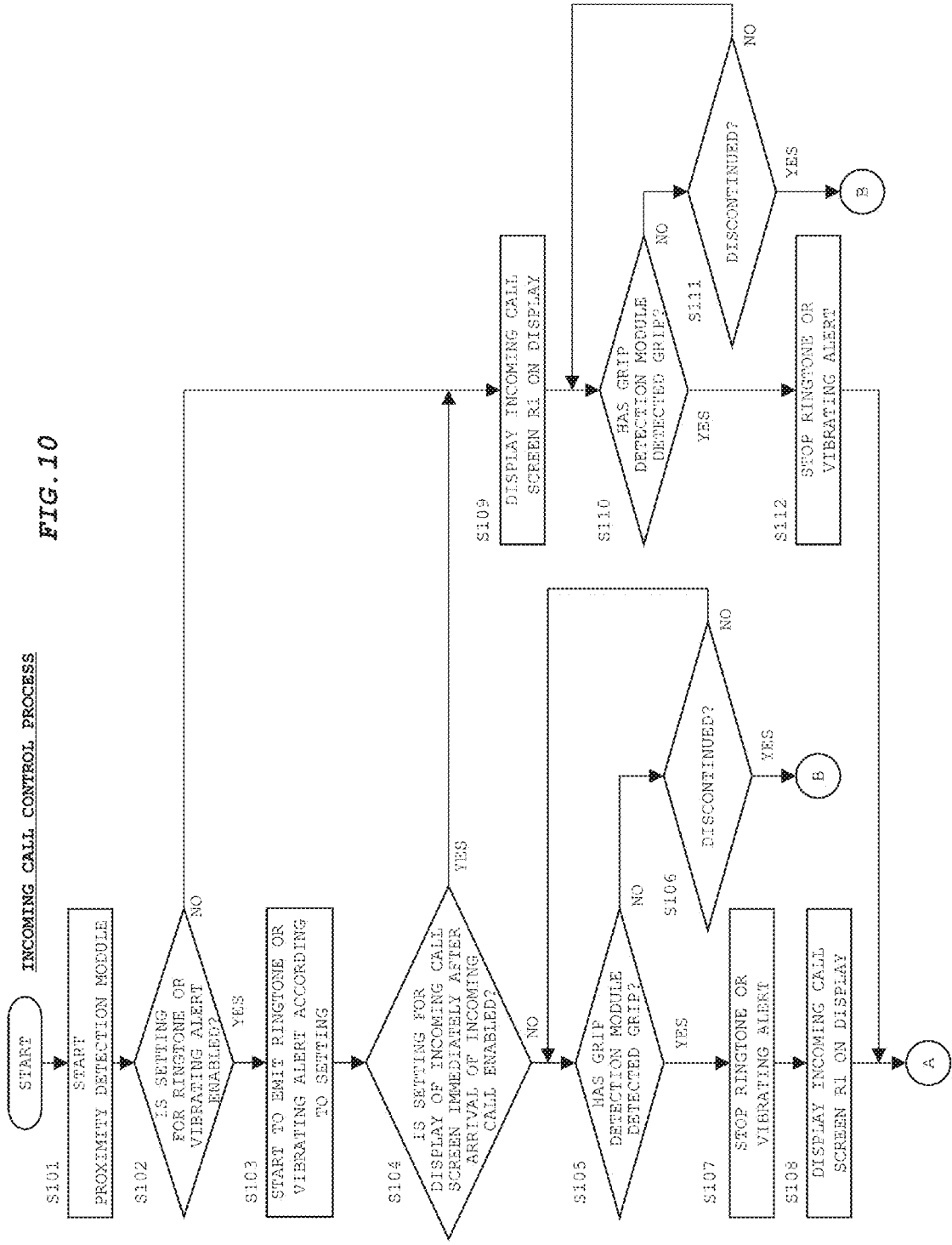

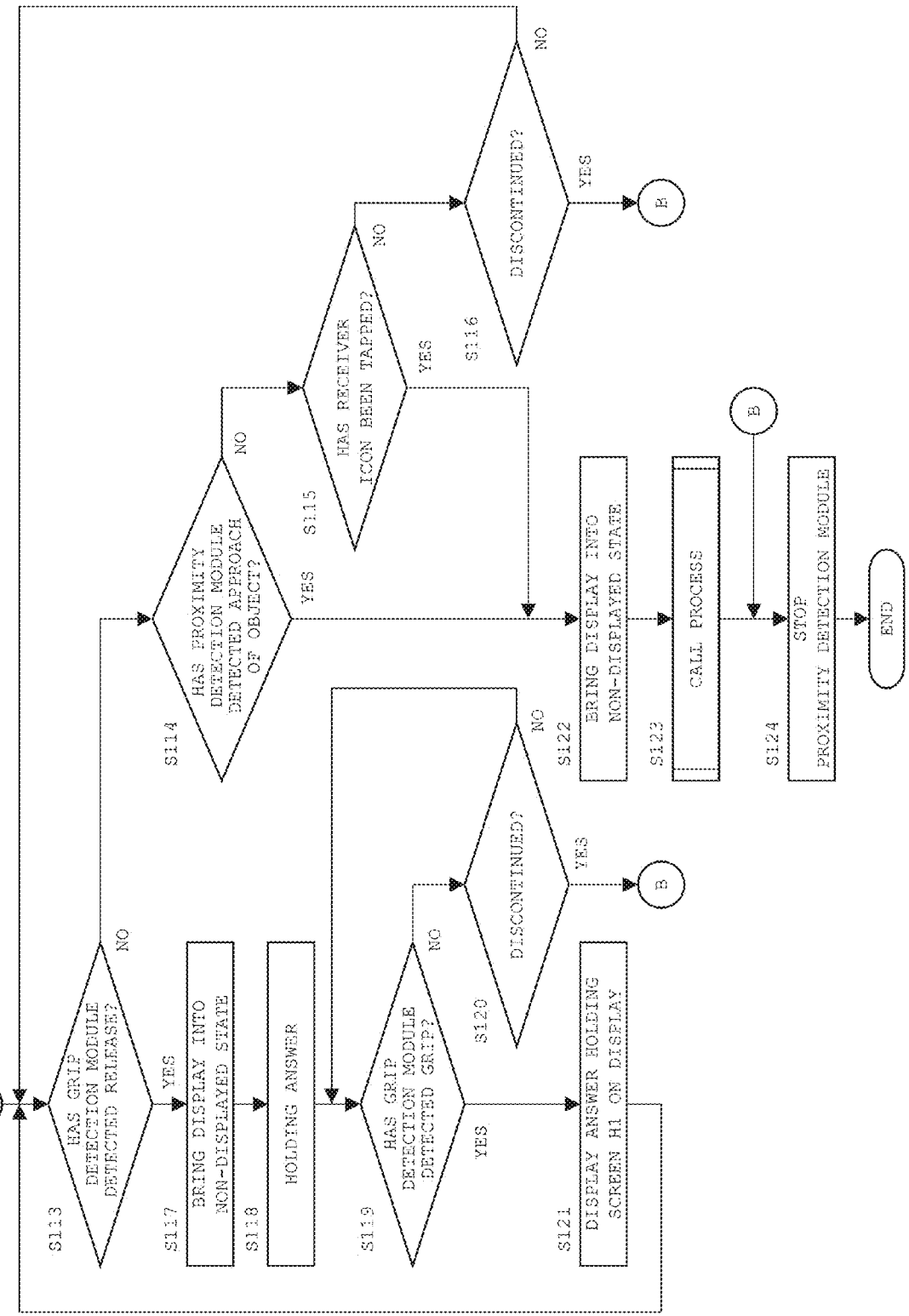

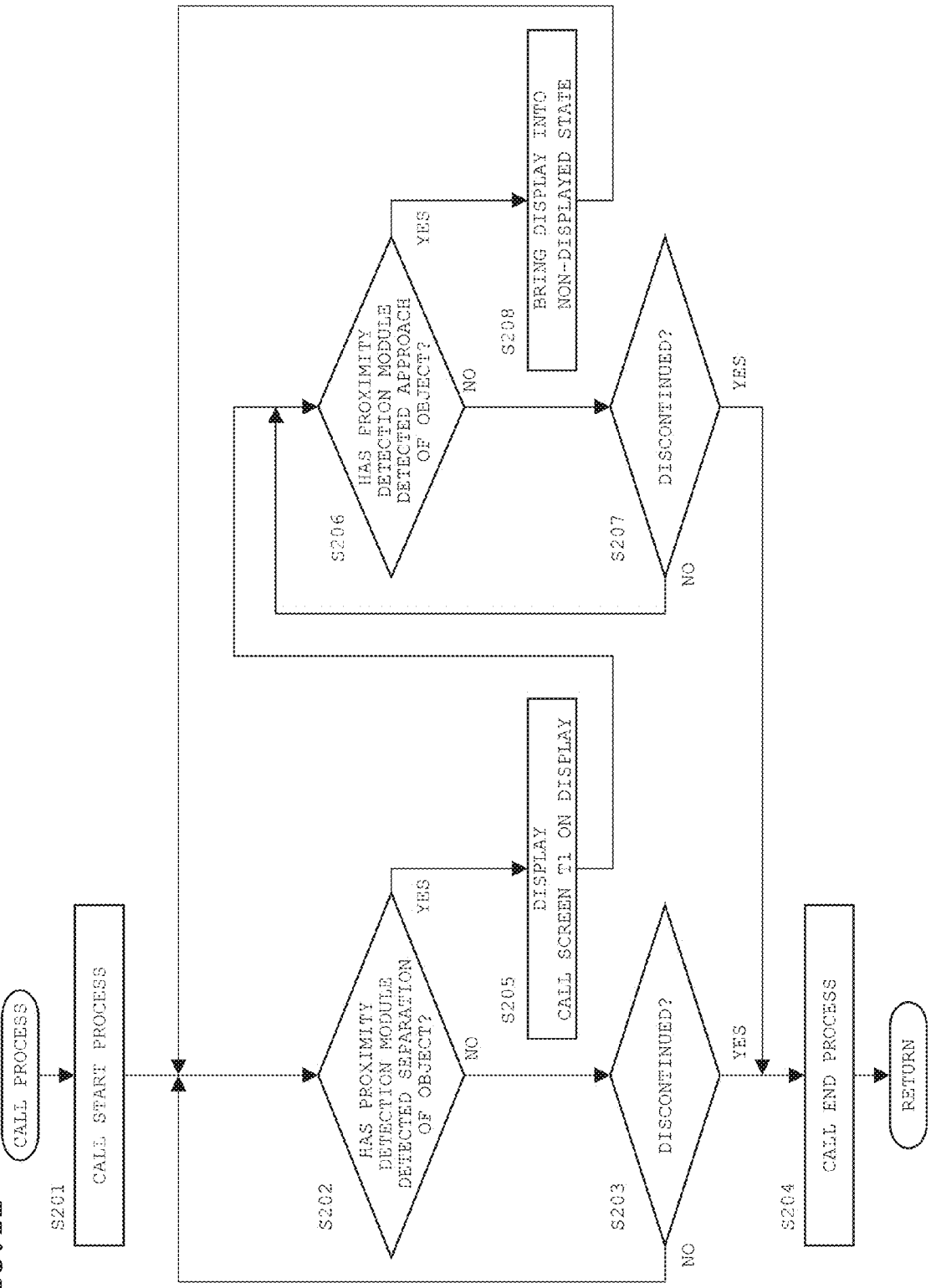

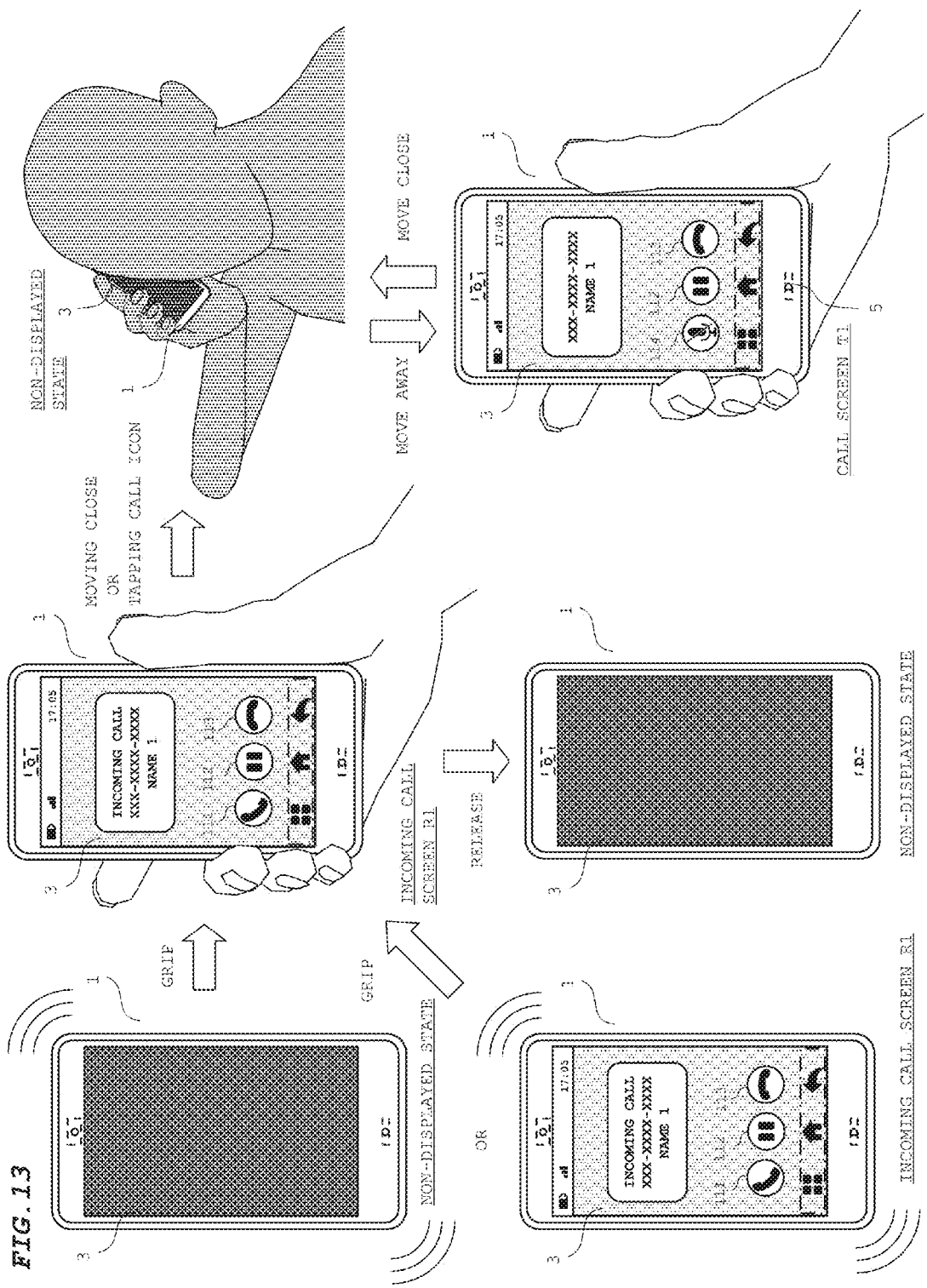

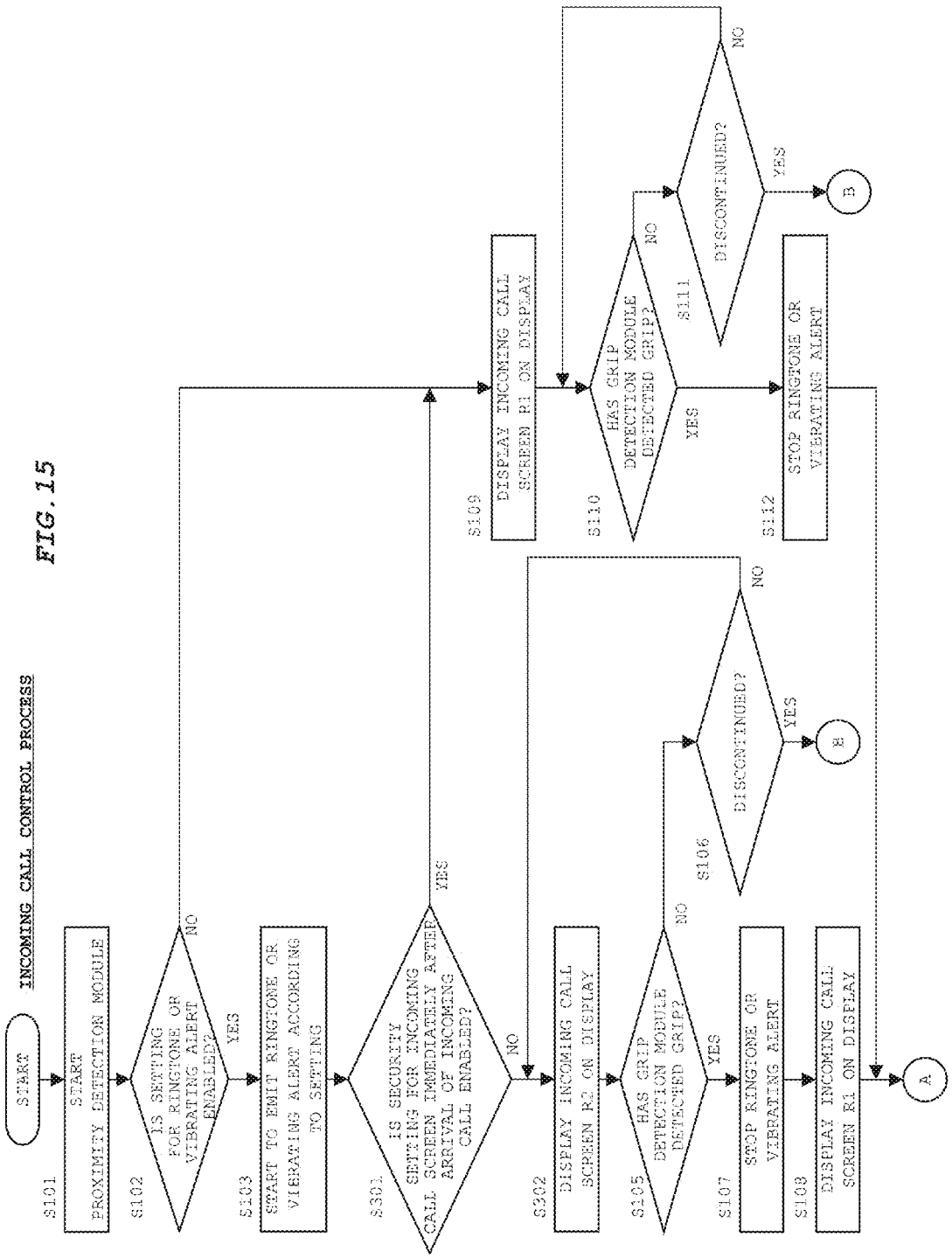

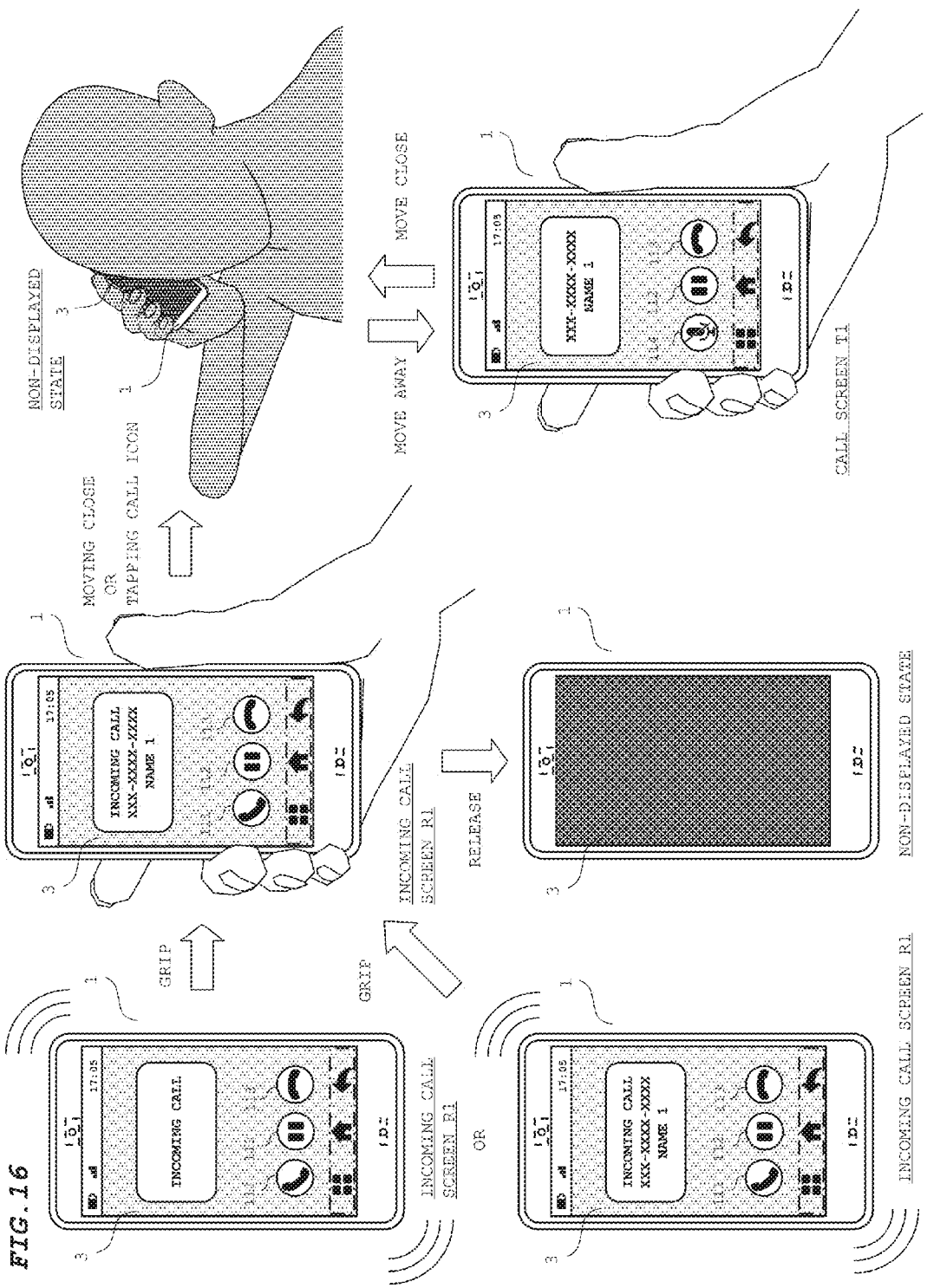

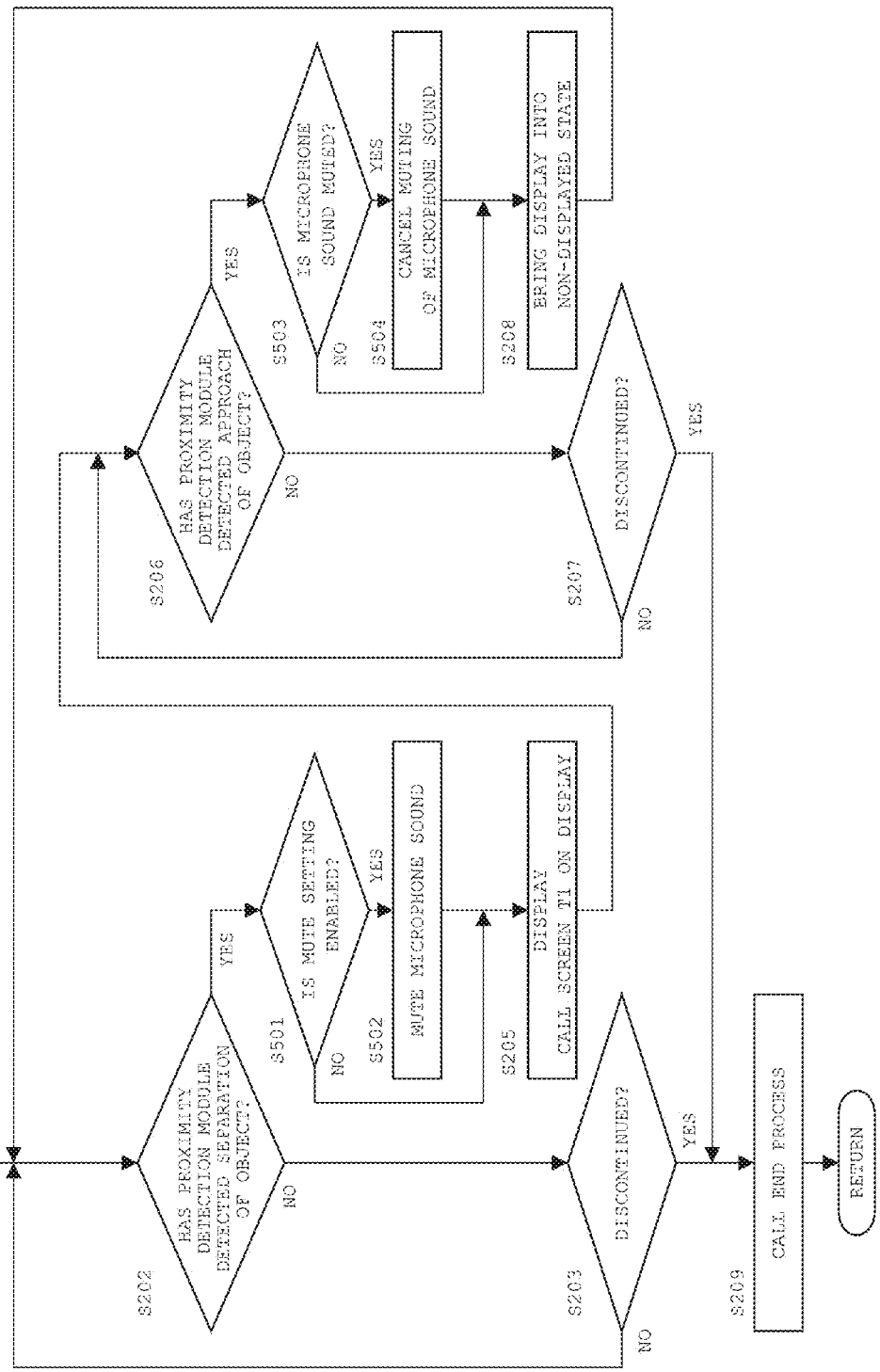

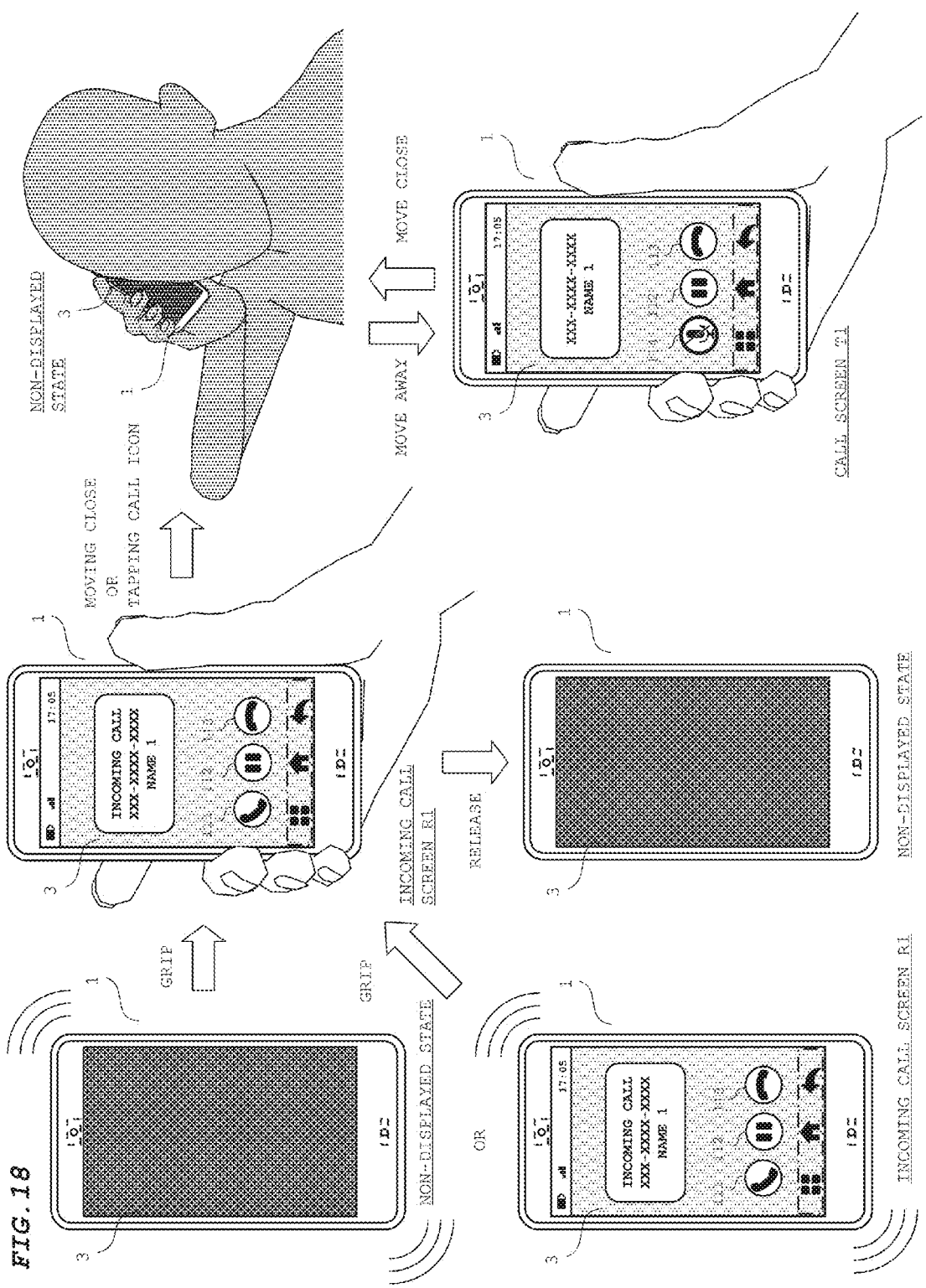

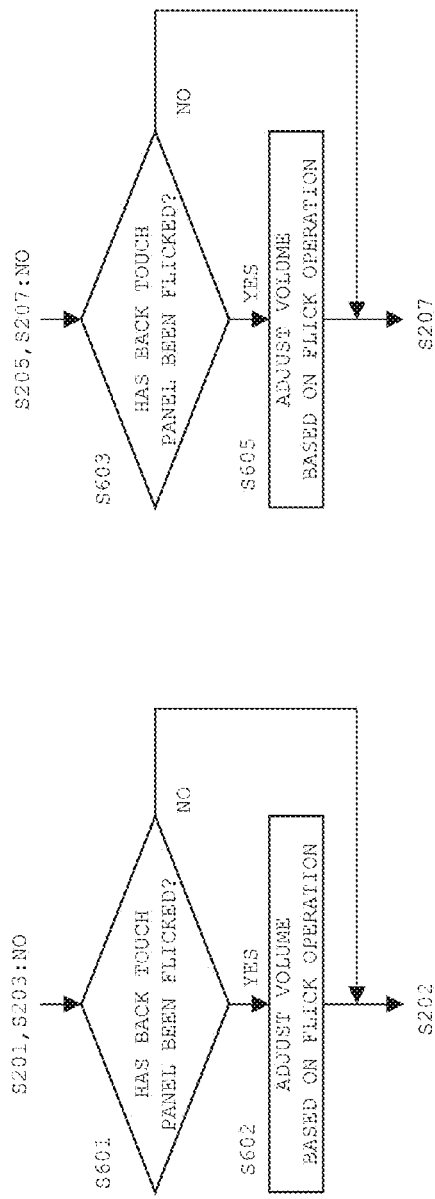
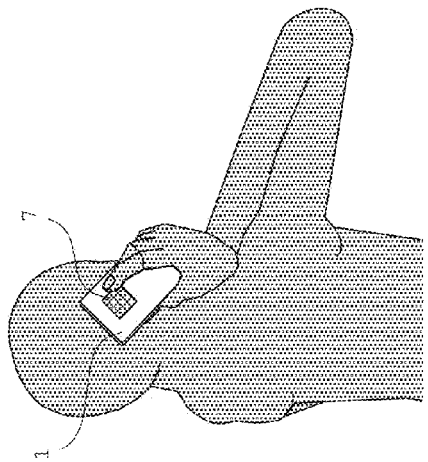
FIG. 19B
FIG. 19D
FIG. 19A
FIG. 19C

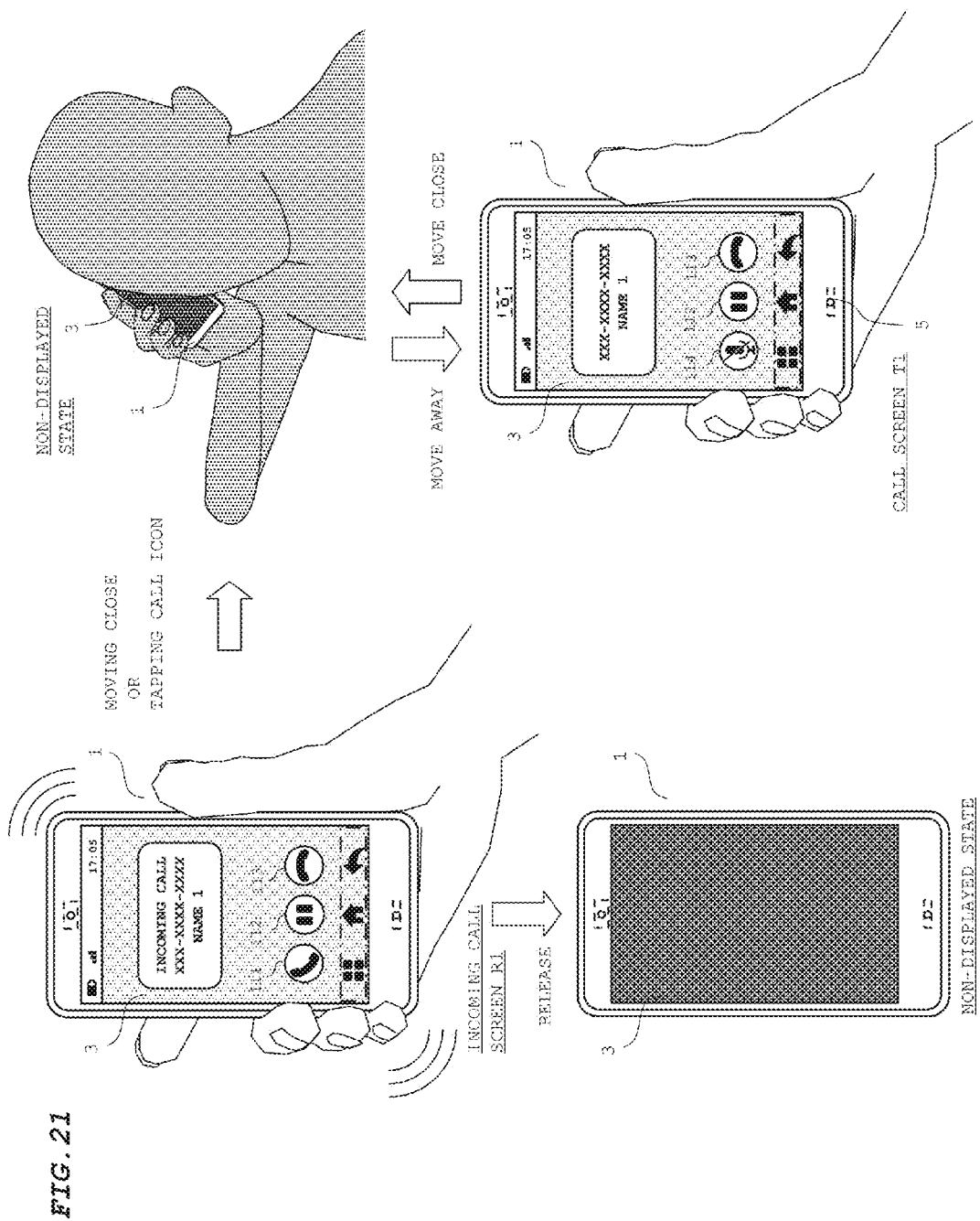

MOBILE TERMINAL DEVICE

CROSS REFERENCE TO RELATED APPLICATION

This application is a bypass continuation of International Application No. PCT/JP2013/084541 filed on Dec. 24, 2013, entitled "MOBILE TERMINAL DEVICE", which claims priority under 35 U.S.C. Section 119 of Japanese Patent Applications No. 2012-281255 filed Dec. 25, 2012, entitled "MOBILE TERMINAL DEVICE", and No. 2012-281252 filed Dec. 25, 2012, entitled "MOBILE TERMINAL DEVICE, PROGRAM, AND MOBILE TERMINAL DEVICE CONTROL METHOD", the disclosures of the above applications are each incorporated herein by reference.

FIELD

This invention generally relates to mobile terminal devices such as mobile phones, personal digital assistants (PDA), tablets, and e-Readers.

BACKGROUND

Conventionally, there are mobile phones in which a touch panel is disposed on a display. Various applications are executed according to a users touch operation on the touch panel. Such a mobile phone may be configured such that an almost rectangular display, slightly smaller than an almost rectangular casing, is formed on the front surface of the casing.

SUMMARY

A mobile terminal device is disclosed. The device includes a display module, a communication module, a sound input module, a sound output module, a hold detection module and a control module. The communication module is configured to receive an incoming call. The sound input module is configured to receive sound from a user. The sound output module is configured to output sound of the call. The hold detection module is configured to detect that the mobile terminal device is held. The control module is configured to perform a process of notifying the caller that the user cannot take the call when the communication module receives an incoming call, the hold detection module detects that the mobile terminal device is held and then the hold detection module detects that the mobile terminal device is not held.

BRIEF DESCRIPTION OF THE DRAWINGS

FIGS. 3A and 3B are diagrams illustrating the configuration of the mobile phone.

FIGS. 4A to 4C are diagrams illustrating the configuration of the mobile phone.

FIGS. 5A to 5C are diagrams a configuration of the mobile phone.

FIGS. 6A to 6D are diagrams illustrating the state in which the mobile phone is gripped.

FIG. 10 is a flowchart of an incoming call control process.

FIG. 11 is a flowchart of the incoming call control process.

FIG. 12 is a flowchart of the incoming call control process.

FIG. 13 is a diagram illustrating a screen display example of a display of the mobile phone.

FIG. 15 is a flowchart of an incoming call control process.

FIG. 16 is a diagram illustrating a screen display example of a display of a mobile phone.

FIG. 17 is a flowchart of an incoming call control process.

FIG. 18 is a diagram illustrating a screen display example of a display of a mobile phone.

FIGS. 19A to 19D are flowcharts of an incoming call control process.

FIG. 21 is a diagram illustrating a screen display example of a display of a mobile phone.

The drawings are merely intended for description and do not limit the scope of the disclosure.

DETAILED DESCRIPTION

Figure 1:
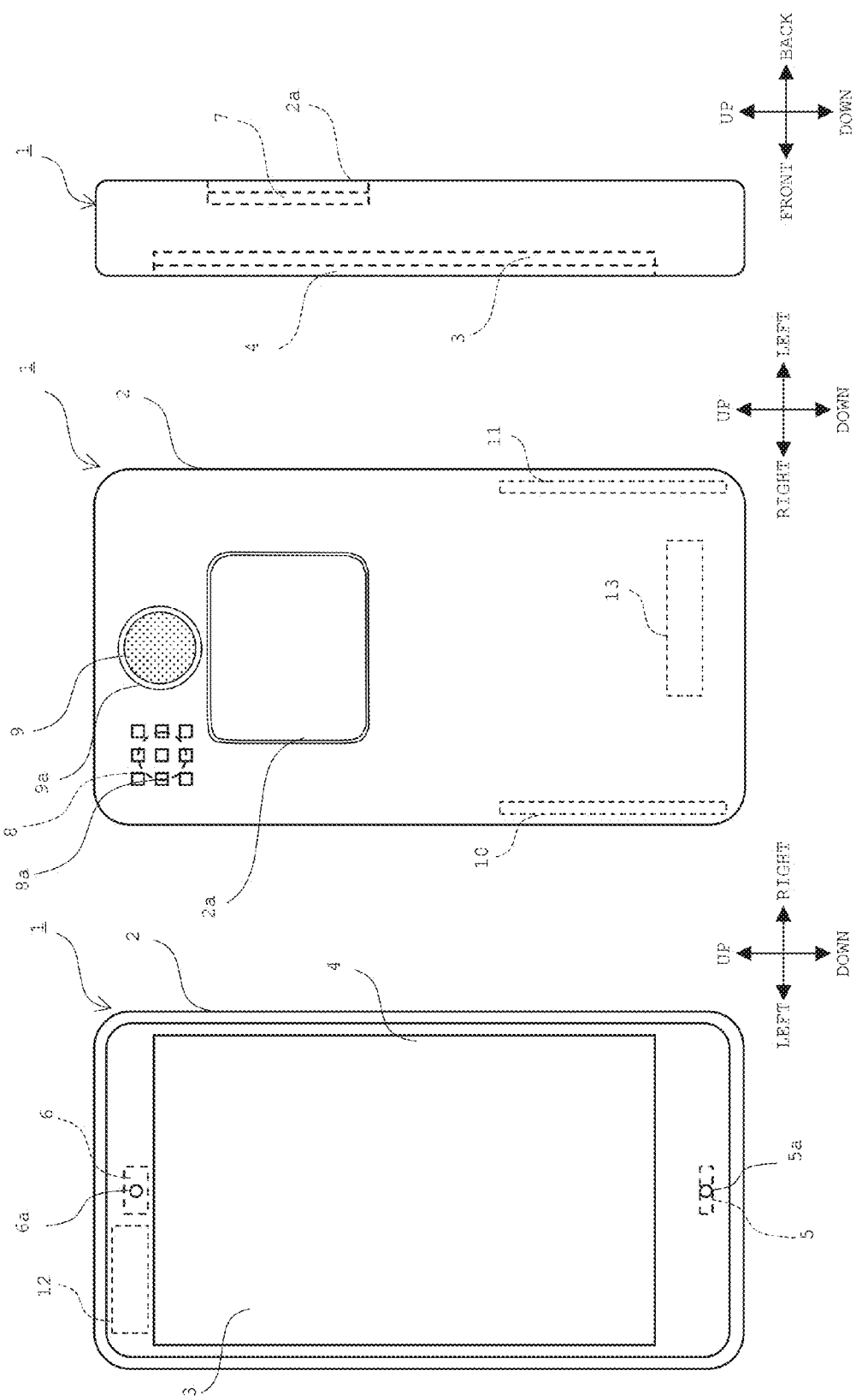
FIG. 1A to 1C are diagrams illustrating a configuration of a mobile phone.

FIGS. 1A, 1B, and 1C are a front view, a rear view, and a right side view of a mobile phone 1, respectively. In the following description, for the sake of convenience, as illustrated in FIGS. 1A to 1C, the long side direction of a housing 2 is defined as up-and-down direction, and the short side direction of the housing 2 is defined as right-and-left direction.

As illustrated in FIGS. 1A to 1C, the mobile phone 1 may include the housing 2, a display 3, a front touch panel 4, a microphone 5, a call speaker 6, a back touch panel 7, an external speaker 8, a camera 9, a radio wave transmission antenna 10, electric field detection antennas 11 and 12, and a radio wave transmission/reception antenna 13.

The housing 2 may have a substantially rectangular contour as viewed from the front side. The display 3 may be disposed on the front surface of the housing 2. Various images may be displayed on the display 3. The display 3 can be a liquid crystal display or any other display such as an organic electroluminescent (EL) display. The front touch panel 4 may be disposed to cover the display 3. The front touch panel 4 may be characteristically a transparent sheet. The front touch panel 4 can be any one of various types of touch panels such as electrostatic capacitive type, ultrasonic type, pressure sensitive type, resistive type, and photosensitive type.

In the housing 2, the microphone 5 may be disposed at a lower end, and the call speaker 6 may be disposed at an upper end. Sound is input into the microphone 5 through a microphone hole 5a in the front surface of the housing 2. The microphone 5 generates an electrical signal in accordance with the input sound. The call speaker 6 outputs sound. The output sound is emitted to the outside through an output hole 6a in the front surface of the housing 2. During the call, the sound received from the communication partners device, such as another mobile phone or the like, is output from the call speaker 6 while the sound emitted by the user is input into the microphone 5. "Sound" includes voice (emitted voice and received voice), ringtones, alarms, and the like.

The housing 2 may have in the back surface a concave portion 2a with an almost rectangular outline. The back touch panel 7 may be disposed on the back surface of the concave portion 2a. The back touch panel 7 may be formed as a transparent sheet as the front touch panel 4 is. The back touch panel 7 may be any one of various types of touch panels such as electrostatic capacitive type, ultrasonic type, pressure sensitive type, resistive type, and photosensitive type.

The external speaker 8 may be disposed in the housing 2. Output holes 8a corresponding to the external speaker 8 are formed in the back surface of the housing 2. Sound output from the external speaker 8 is emitted to the outside through the output holes 8a.

The camera 9 may be disposed in the housing 2. A lens window 9a is provided on the back surface of the housing 2. An image of a subject is taken into the camera 9 through the lens window 9a.

The radio wave transmission antenna 10 may be disposed near the right side surface in the housing 2, and the electric field detection antenna 11 may be disposed near the left side surface in the housing 2. The radio wave transmission antenna 10 generates weak radio waves at a first periodic timing. An electric field is generated by the radio waves transmitted from the radio wave transmission antenna 10. This electric field is not detected by the electric field detection antenna 11 when the right and left side surfaces of the housing 2 are not connected by a medium bringing the electric field into conduction. When the user holds the right and left side surfaces of the housing 2 with user's hand, the hand serves as a medium to transfer the electric field generated by the radio waves transmitted from the radio wave transmission antenna 10, to the electric field detection antenna 11. Thus, the electric field detection antenna 11 detects the electric field.

Upon detection of the electric field, the electric field detection antenna 11 outputs a detection signal to a control module 21 described later. During the detection of the electric field, the electric field detection antenna 11 may output a first detection signal to the control module 21. During reception of the first detection signal, the control module 21 may determine that the electric field is detected. In addition, upon detection of the electric field, the electric field detection antenna 11 may output a second detection signal to the control module 21. When the electric field is no longer detected, the electric field detection antenna 11 may output a third detection signal to the control module 21. Upon reception of the second detection signal, the control module 21 may determine that the electric field is detected, and then upon reception of the third detection signal, the control module 21 may determine that the detection of the electric field is terminated.

The electric field detection antenna 12 may be disposed near the call speaker 6 in the housing 2. The radio wave transmission antenna 10 generates weak radio waves at a second periodic timing different from the first periodic timing. An electric field is generated by the radio waves transmitted from the radio wave transmission antenna 10 but is not detected by the electric field detection antenna 12 in the state where the upper end portion of the front side and the right side surface of the housing 2 are not connected by a medium bringing the electric field into conduction. When the user holds the housing 2 and brings the call speaker 6 close to his/her ear, the part of his/her body from the hand to the ear serves as a medium through which the electric field generated by the radio waves transmitted from the radio wave transmission antenna 10 is transferred to the electric field detection antenna 12, and the electric field detection antenna 12 detects the electric field. Upon detection of the electric field, the electric field detection antenna 12 outputs a detection signal to the control module 21 described later.

Figure 2:
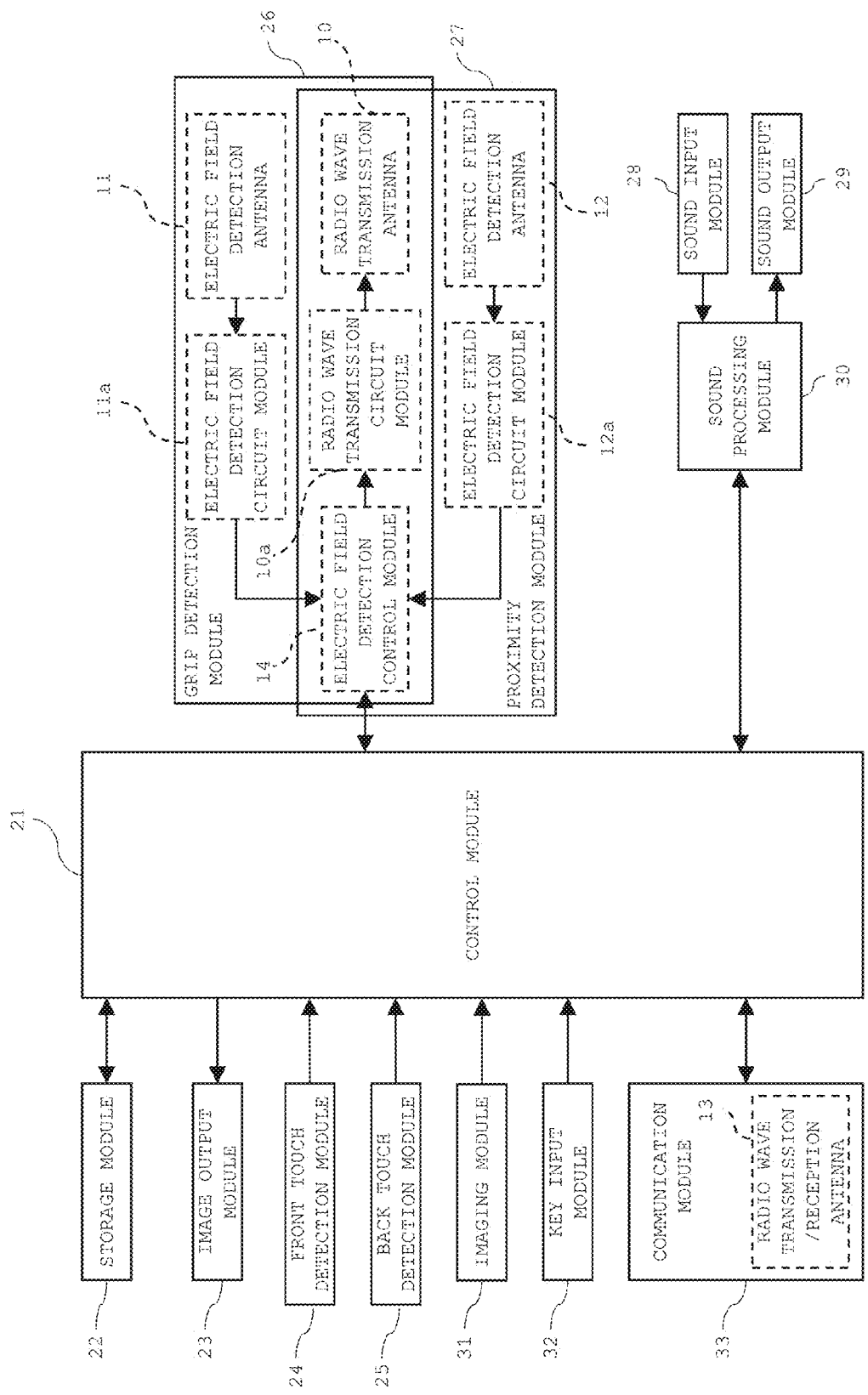
FIG. 2 is a block diagram illustrating the entire configuration of the mobile phone.

FIG. 2 is a block diagram illustrating the entire configuration of the mobile phone 1. The mobile phone 1 may include the control module 21, a storage module 22, an image output module 23, a front touch detection module 24, a back touch detection module 25, a grip detection module 26, an proximity detection module 27, a sound input module 28, a sound output module 29, a sound processing module 30, an imaging module 31, a key input module 32, and a communication module 33.

The storage module 22 may include a ROM, a RAM, an external memory, and the like. The storage module 22 stores various programs. The programs stored in the storage module 22 include a control program for controlling the modules of the mobile phone 1, and various applications such as applications relating to phone, email, phone book, map, games, schedule management, and others. The programs may be stored in the storage module 22 when the mobile phone 1 is produced by the manufacturer, or may be stored in the storage module 22 by the user via a communication network or a storage medium such as a memory card.

The storage module 22 may also include a working area for storing data temporarily used or generated at execution of programs.

The control module 21 may include a CPU and the like. The control module 21 controls the modules constituting the mobile phone 1, such as the control module 21, the storage module 22, the image output module 23, the front touch detection module 24, the back touch detection module 25, the grip detection module 26, the proximity detection module 27, the sound input module 28, the sound output module 29, the sound processing module 30, the imaging module 31, the key input module 32, the communication module 33, and others in accordance with programs.

The image output module 23 may include the display 3 illustrated in FIG. 1A and the like. The image output module 23 displays an image on the display 3, based on a control signal and an image signal from the control module 21.

The front touch detection module 24 may include the front touch panel 4 illustrated in FIG. 1A. The front touch detection module 24 detects by the front touch panel 4 the users touch operation on the display 3 illustrated in FIG. 1A. Specifically, the front touch detection module 24 detects the position touched by the users finger on the display 3 (touch position) and outputs a position signal corresponding to the detected touch position to the control module 21. Accordingly, the user can feel as if he/she controls the mobile phone 1 by touching the display 3 with the finger.

The user can perform various touch operations by touching the display 3 with a finger. Examples of the touch operations are a tap operation, a flick operation, a slide operation, and a long-tap operation. The tap operation is an operation of touching the display 3 with a finger and then releasing the finger from the display 3 within a short time. The flick operation is an operation of flipping the display 3 with a finger in an arbitrary direction. The slide operation is an operation of moving the finger on the display 3 in an arbitrary direction while holding the finger in contact with the display 3. The flick operation and the slide operation are touch operations with movement of a touch position. The long-tap operation is an operation of touching the display 3 with a finger, holding the touch for a while, and then releasing the finger from the display 3.

The touch operations will now be described in detail. For instance, after detection of a touch position on the display 3, when the front touch detection module 24 has not detected the touch position any longer within a predetermined first time, that is, when the finger has been released from the display 3 within the predetermined first time, the control module 21 determines that the touch operation is a tap operation. After detection of a touch position on the display 3 by the front touch detection module 24 and the touch position has been moved by a predetermined first distance or more within a predetermined second time, when the touch position has not been detected any longer, the control module 21 determines that the touch operation is a flick operation. After detection of a touch position on the display 3 by the front touch detection module 24, when the touch position has been moved by a predetermined second distance or more, the control module 21 determines that the touch operation is a slide operation. After detection of a touch position on the display 3 by the front touch detection module 24, when the touch position has been continuously detected for a predetermined third time or more and then the touch position has not been detected any longer, the control module 21 determines that the touch operation is a long-tap operation.

The back touch detection module 25 may include the back touch panel 7 illustrated in FIG. 10. The back touch detection module 25 detects by the back touch panel 7 the users touch operation on the concave portion 2*a* illustrated in FIG. 1B. Specifically, the back touch detection module 25 detects the position touched by the users finger on the concave portion 2*a* (touch position) and outputs a position signal corresponding to the detected touch position to the control module 21.

The user may perform the same touch operations as a touch operation on the front touch panel 4 by touching the concave portion 2*a* with the finger. In addition, the operations of the mobile phone 1 may be controlled through the users touch operations on the back touch panel 7.

The grip detection module 26 may include the radio wave transmission antenna 10 illustrated in FIG. 1B, a radio wave transmission circuit module 10*a*, the electric field detection antenna 11 illustrated in FIG. 1B, an electric field detection circuit module 11*a*, and an electric field detection control module 14. The proximity detection module 27 may include the radio wave transmission antenna 10 illustrated in FIG. 1B, the radio wave transmission circuit module 10*a*, the electric field detection antenna 12 illustrated in FIG. 1A, an electric field detection circuit module 12*a*, and the electric field detection control module 14. The grip detection module 26 and the proximity detection module 27 use in common the radio wave transmission antenna 10 and the radio wave transmission circuit module 10*a* by controlling the radio wave transmission antenna 10 and the radio wave transmission circuit module 10*a* in a time-sharing manner.

The electric field detection control module 14 drives the radio wave transmission circuit module 10*a* under an instruction from the control module 21. The radio wave transmission circuit module 10*a* includes a D/A conversion circuit, a pulse generation circuit, and the like, to generate a signal for transmitting radio waves for detection of the users grip and a signal for transmitting radio waves for detection of proximity of the users ear. The radio wave transmission antenna 10 transmits weak radio waves for detection of the users grip at the first periodic timing in response to the signal from the radio wave transmission circuit module 10*a*. The radio wave transmission antenna 10 also transmits weak radio waves for detection of proximity of the users ear at the second periodic timing different from the first periodic timing in response to the signal from the radio wave transmission circuit module 10*a*.

Upon detection of the electric field, the electric field detection antenna 11 transmits a detection signal to the electric field detection circuit module 11*a*. The electric field detection antenna 11 and the electric field detection circuit module 11*a* are both part of the grip detection module 26. The electric field detection circuit module 11*a* includes an A/D conversion circuit, a pulse generation circuit, and the like. The electric field detection circuit module 11*a* takes in the detection signal at a timing corresponding to the first periodic timing and transmits the signal to the electric field detection control module 14. The electric field detection control module 14 detects the detection signal from the electric field detection circuit module 11*a* at a timing corresponding to the first periodic timing, and outputs a detection signal notifying detection of the users grip to the control module 21.

Upon detection of the electric field, the electric field detection antenna 12 transmits a detection signal to the electric field detection circuit module 12*a*. The electric field detection antenna 12 and the electric field detection circuit module 12*a* are both part of the proximity detection module 27. The electric field detection circuit module 12*a* includes an A/D conversion circuit, a pulse generation circuit, and the like. The electric field detection circuit module 12*a* takes in the detection signal at a timing corresponding to the second periodic timing, and it transmits the signal to the electric field detection control module 14. The electric field detection control module 14 detects the detection signal from the electric field detection circuit module 12*a* at a timing corresponding to the second periodic timing, and outputs a detection signal notifying detection of proximity of the users ear to the control module 21.

The sound input module 28 may include the microphone 5 or the like. The sound input module 28 outputs an electrical signal from the microphone 5 to the sound processing module 30.

The sound output module 29 may include the call speaker 6 and the external speaker 8. The sound output module 29 receives an electrical signal from the sound processing module 30, and outputs sound such as voice, alarms, and the like from the call speaker 6 or the external speaker 8.

The sound processing module 30 performs A/D conversion on the electrical signal from the sound input module 28, and outputs a converted digital sound signal to the control module 21. The sound processing module 30 performs decoding, D/A conversion, and the like on the digital sound signal from the control module 21, and outputs a converted electrical signal to the sound output module 29.

The imaging module 31 may include the camera 9 with a CMOS image sensor illustrated in FIG. 1B, an imaging control circuit, and the like. The imaging module 31 performs various types of image processing on image data of images taken by the camera 9 and outputs the image data after the image processing to the control module 21.

When any of various hardware keys (not illustrated) disposed on the mobile phone 1 such as a power key for powering on the mobile phone 1 is pressed, the key input module 32 outputs a signal corresponding to the pressed hardware key to the control module 21.

The communication module 33 may include a circuit for converting signals for calling or telecommunication, the radio wave transmission/reception antenna 13 illustrated in FIG. 1B, and the like. The communication module 33 converts the signals for calling or telecommunication from the control module 21 into radio signals and transmits the radio signals to a base station or another destination such as a communication device via the radio wave transmission/reception antenna 13. The communication module 33 further converts radio signals received via the radio wave transmission/reception antenna 13 into signals in a form usable by the control module 21, and it outputs the converted signals to the control module 21.

The mobile phone 1 as described above has a control function corresponding to the users grip of the mobile phone 1 and a structure suited for detecting the users grip of the mobile phone 1.

<Structure>

First, a specific example of a structure of the mobile phone 1 suited for detecting the users grip will be described. Only a structure related to the grip detection module 26 will be described in detail, and detailed descriptions of the other components will be omitted. This description is illustrative and not restrictive.

FIG. 3A is a perspective view of a main body module 201 of the housing 2, and FIG. 3B is a perspective view of a cover 202 of the housing 2.

The housing 2 may include the main body module 201 and the cover 202. The main body module 201 may have therein a circuit board 301 including the control module 21 illustrated in FIG. 2 and the like. The main body module 201 may have curved surfaces 201a and 201d at right and left ends of the back surface.

A concave portion 201b may be formed at the lower end of the curved surface 201a. An opening 201c may be formed at the upper side of the concave portion 201b to expose a contact spring 301a of the circuit board 301 to the outside. Similarly, a concave portion 201e may be formed at the lower end of the curved surface 201d. An opening 201f may be formed at the upper side of the concave portion 201e to expose a contact spring 301b of the circuit board 301 to the outside. A concave portion 201g may be formed at the lower portion of the main body module 201. An opening 201h may be formed at the left end of the concave portion 201g to expose a terminal 301c of the circuit board 301 to the outside.

In the main body module 201, constituent members such as the circuit board 301 and the back side frame may be screwed by a plurality of screws into the front side frame. Screws 201i and 201j may be arranged around the concave portion 201b, and screws 201k and 201l may be arranged around the concave portion 201e. The screws 201i to 201l may be formed from non-magnetic members of resin material or Inconel.

Besides, the main body module 201 may have the camera 9, a battery, a concave portion in which an antenna used for various wireless communications is placed, and hardware keys such as a power key, a shutter button, and others.

The cover 202 may have a bottom surface 202a and cover the back surface of the main body module 201. The cover 202 may have a curved surface 202b at a position opposed to the curved surface 201a of the main body module 201, and may have a curved surface 202c at a position opposed to the curved surface 201d of the main body module 201. The cover 202 may have a lower edge portion 202d and an upper edge portion that are ribbed to be higher than the bottom surface 202a.

A flexible printed circuit (FPC) 203 may be stuck to the curved surface 202b opposed to the concave portion 201b. A circuit pattern of the electric field detection antenna 11 may be disposed on the FPC 203. The FPC 203 may have a connector 203a for connection to the circuit board 301 at the upper end thereof. A terminal 203b may be disposed on the connector 203a to connect electrically the circuit pattern of the electric field detection antenna 11 on the FPC 203 and the circuit board 301 via the contact spring 301a.

Similarly, an FPC 204 may be stuck to the curved surface 202b opposed to the concave portion 201e of the main body module 201. A circuit pattern of the radio wave transmission antenna 10 may be disposed on the FPC 204. The FPC 204 may have a connector 204a for connection to the circuit board 301 at the upper end thereof. A terminal 204b may be disposed on the connector 204a to connect electrically the circuit pattern of the radio wave transmission antenna 10 on the FPC 204 and the circuit board 301 via the contact spring 301b.

The cover 202 may have on the bottom surface 202a the back touch panel 7, an antenna used for various wireless communications, reinforcement ribs, nails for fixation of the cover 202 to the main body module 201, and others.

FIG. 4A is a diagram illustrating the positional relationship between the FPCs 203 and 204 when the cover 202 is attached to the main body module 201. FIG. 4B is a partial enlarged view of the FPC 204 and its surroundings, and FIG. 4C is a partial enlarged view of the FPC 203 and its surroundings. FIG. 4A does not illustrate the cover 202 for the sake of convenience.

Referring to FIG. 4A, when the cover 202 is attached, the FPC 203 is positioned in the concave portion 201b of the main body module 201, and the FPC 204 is positioned in the concave portion 201e of the main body module 201. At that time, the terminal 203b (refer to FIG. 3B) of the FPC 203 comes into contact with the contact spring 301a (refer to FIG. 3A) of the circuit board 301. In addition, the terminal 204b (refer to FIG. 3B) of the FPC 204 comes into contact with the contact spring 301b (refer to FIG. 3A) of the circuit board 301. Accordingly, the circuit pattern of the radio wave transmission antenna 10 disposed on the FPC 204 and the circuit board 301 are electrically connected, and the circuit pattern of the electric field detection antenna 11 disposed on the FPC 203 and the circuit board 301 are electrically connected.

FIG. 5A is a rear view of the mobile phone 1 in which the cover 202 is seen through.

In the rear view, the FPC 204 with the radio wave transmission antenna 10 is disposed at the lower right end of the mobile phone 1. The FPC 203 with the electric field detection antenna 11 is disposed at the lower left end of the mobile phone 1. The screws 201i through 201l disposed near the FPCs 203 and 204 are non-magnetic members, which suppress influence on an electric field generated by the radio waves transmitted from the radio wave transmission antenna 10 of the FPC 204.

FIG. 5B is a diagram illustrating the right end and its surrounding of the cross-sectional view of FIG. 5A along line A-A. FIG. 5C is a diagram illustrating the right end and its surrounding of the cross-sectional view of a comparative example of FIG. 5A along line A-A.

In the comparative example of FIG. 5C, a cover 202' has vertical edges at right and left ends thereof instead of the curved surfaces 202b and 202c, and has an FPC 204' with the radio wave transmission antenna 10 on the bottom surface 202a. In this case, for example, when the mobile phone 1 is placed on an electrically-conductive flat plane such as a metallic desk top, an electric field generated by radio waves transmitted from the radio wave transmission antenna 10 are transferred to the electric field detection antenna 11 via the metallic desk, and the control module 21 may detect wrongly that the user has gripped the mobile phone 1.

In one embodiment, as illustrated in FIG. 5B, the FPC 204 with the radio wave transmission antenna 10 is stuck to the curved surface 202c of the cover 202. Thus the FPC 204 is gradually more distant from the flat surface such as a desk top with decreasing proximity to the center of the mobile phone 1. In this embodiment, therefore, it is possible to reduce false detection of the users grip that may occur when the mobile phone 1 is placed on an electrically conductive flat plane as compared to the case of the comparative example.

In addition, in this embodiment, as illustrated in FIG. 5B, the back end of the FPC 204 with the radio wave transmission antenna 10 is distant at a predetermined spacing C from the bottom surface 202a of the cover 202, which can further reduce the potential for false detection of the users grip at placement of the mobile phone 1.

Although not illustrated, similarly with the FPC 204, the FPC 203 with the electric field detection antenna 11 is disposed on the curved surface 202b of the cover 202, and the back end of the FPC 203 is distant at the predetermined spacing C from the bottom surface 202a of the cover 202. Therefore, it is possible to further suppress false detection of the users grip at placement of the mobile phone 1.

In the present embodiment, the FPC 204 with the radio wave transmission antenna 10 and the FPC 203 with the electric field detection antenna 11 are both disposed at the predetermined spacing C from the bottom surface 202a of the cover 202. Alternatively, the FPCs 203 and 204 may be disposed so as to cover a part of the bottom surface 202a of the cover 202. Also in this case, the FPCs 203 and 204 are disposed on the curved surfaces 202b and 202c, and thus they are more distant from the bottom surface 202a of the cover 202 with decreasing proximity to the center of the mobile phone 1. Therefore, it is possible to further suppress the false detection of the users grip at placement of the mobile phone 1 as compared to the comparative example of FIG. 5C. To effectively prevent false detection of the users grip at the placement of the mobile phone 1, the FPCs 203 and 204 are desirably disposed at the predetermined spacing C from the bottom surface 202a of the cover 202 as illustrated in FIG. 5B.

FIG. 6A is a front view of the mobile phone 1 gripped by the user with the right hand, FIG. 6B is a rear view of the mobile phone 1 gripped by the user with the right hand, FIG. 6C is a cross-sectional view of a right end and its periphery of the mobile phone 1 gripped by the user with the right hand, and FIG. 6D is a cross-sectional view of a right end and its periphery of a mobile phone 1 in a comparative example gripped by the user with the right hand.

When the user grips the mobile phone 1, the FPC 204 with the radio wave transmission antenna 10 comes into contact with the base of the right hand's thumb via the curved surface 202c of the cover 202. In addition, the FPC 203 with the electric field detection antenna 11 comes into contact with the right hand's little finger, ring finger, and middle finger from the first joints to the second joints and their peripheral portions via the curved surface 202b of the cover 202.

An electric field is generated by radio waves transmitted from the radio wave transmission antenna 10 and is transferred to the electric field detection antenna 11, and the electric field detection antenna 11 detects the electric field. Accordingly, the electric field detection antenna 11 outputs a detection signal to the control module 21 to notify that the users grip has been detected.

In the comparative example of FIG. 6D, a cover 202' has vertical edges, instead of the curved surfaces 202b and 202c. Accordingly, the edge comes into contact with the base of the thumb of the users right hand. The back surface and side surface of the cover 202' do not come into contact with the right hand, and a large clearance occurs between the FPC 204' with the radio wave transmission antenna 10 and the right hand. In contrast, in an embodiment, the cover 202 is provided with the curved surfaces 202b and 202c, which allows the user to bring the right hand into contact with the cover 202 with substantially no gap therebetween. Accordingly, the user can bring the right hand close to the radio wave transmission antenna 10 and the electric field detection antenna 11 disposed on the curved surfaces 202c and 202b of the cover 202. Therefore, the grip detection module 26 can detect properly the users grip of the mobile phone 1.

In addition, a right-handed user is likely to grip the mobile phone 1 with the base of the right hand's thumb in contact with the lower right corner and its periphery of the mobile phone 1. Therefore, as illustrated in FIG. 6A, providing the radio wave transmission antenna 10 and the electric field detection antenna 11 at the lower end portion of the mobile phone 1 allows the user to bring the right hand close to the radio wave transmission antenna 10 and the electric field detection antenna 11 in a more certain manner. This makes it possible to detect the users grip more properly.

As in the foregoing, according to the present embodiment, the radio wave transmission antenna 10 and the electric field detection antenna 11 of the grip detection module 26 are disposed on the curved surfaces 202b and 202c of the cover 202, thereby to prevent false detection of the users grip at the placement of the mobile phone 1. Further, the user is allowed to contact the cover 202 by the hand with substantially no between the cover 202 and the hand, which realizes proper detection of the users grip.

In addition, according to this embodiment, the FPC 204 with the radio wave transmission antenna 10 and the FPC 203 with the electric field detection antenna 11 are each disposed at the predetermined spacing C from the bottom surface 202a of the cover 202, which makes it possible to further suppress false detection of the users grip at the placement of the mobile phone 1.

Further, according to this embodiment, the radio wave transmission antenna 10 and the electric field detection antenna 11 are disposed at the lower end portion of the mobile phone 1 where the users hand is likely to come into contact when gripping the mobile phone 1. This makes it possible to accurately detect the users grip.

Moreover, according to this embodiment, the screws 201i through 201l disposed near the radio wave transmission antenna 10 and the electric field detection antenna 11 are non-magnetic members. This makes it possible to suppress influence on the electric field generated by radio waves transmitted from the radio wave transmission antenna 10.

<Modification Example of the Structure>

In the mobile phone 1 of an embodiment described above, the FPCs 203 and 204 are disposed to cover the curved surfaces 202c and 202b of the cover 202, respectively. In this modification example, as illustrated in FIG. 7, the FPC 203 is disposed to cover the curved surface 202c (refer to FIG. 3B) and the lower edge portion 202d (refer to FIG. 3B) of the cover 202, and the FPC 204 is disposed to cover the curved surface 202b (refer to FIG. 3B) and the lower edge portion 202d (refer to FIG. 3B) of the cover 202.

Figure 7:
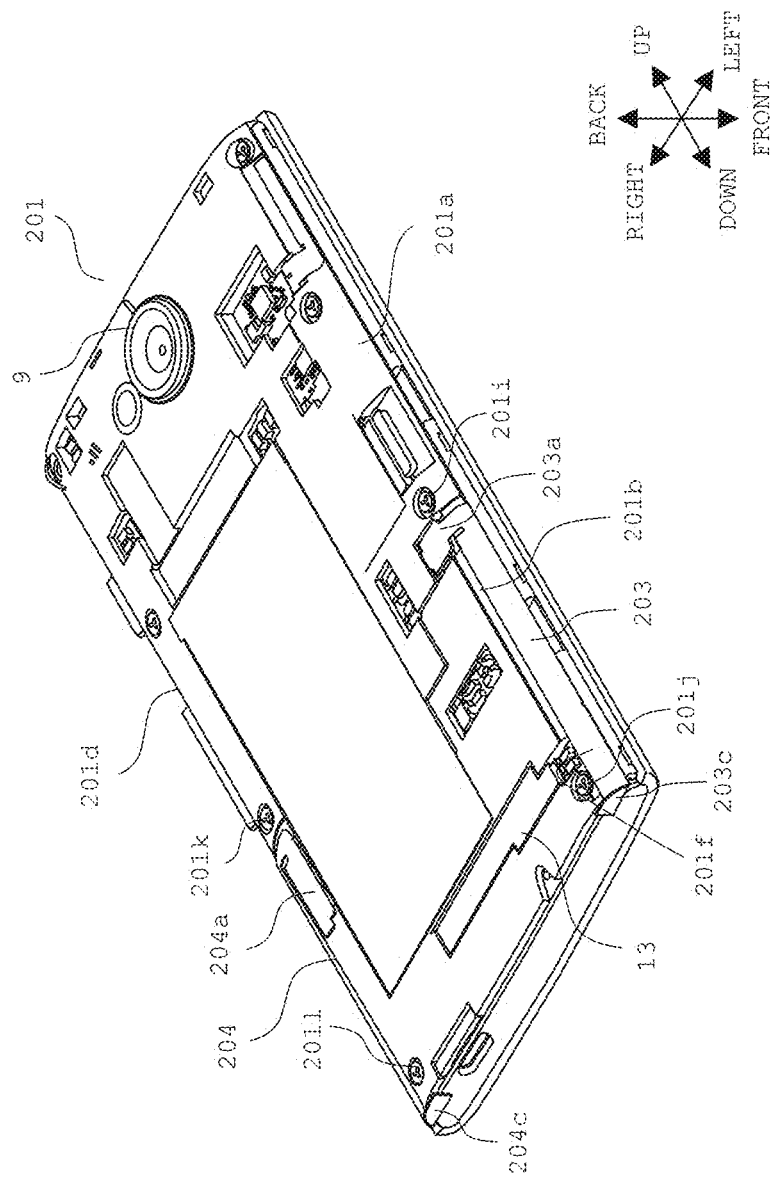
FIG. 7 is a diagram illustrating a configuration of a mobile phone.

FIG. 7 is a diagram illustrating the positional relationship between the FPCs 203 and 204 when the cover 202 is attached to the main body module 201. FIG. 7 does not illustrate the cover 202 for the sake of convenience.

The FPCs 203 and 204 may have bended portions 203c and 204c at the lower ends thereof, respectively. The bended portions 203c and 204c may be stuck to the lower edge portion 202d (refer to FIG. 3B) of the cover 202. Therefore, the radio wave transmission antenna 10 and the electric field detection antenna 11 may be disposed at the right and left ends of the lower edge portion 202d as well as on the curved surfaces 202b and 202c of the cover 202.

When the user grips the mobile phone 1 with the right hand, the palm of the right hand is likely to contact the lower portion of the cover 202 as illustrated in FIG. 6A. Therefore, as in the modification example, disposing the radio wave transmission antenna 10 and the electric field detection antenna 11 to cover the lower edge portion 202d of the cover 202 makes it possible to detect the users grip in a more reliable manner.

Figure 8B:
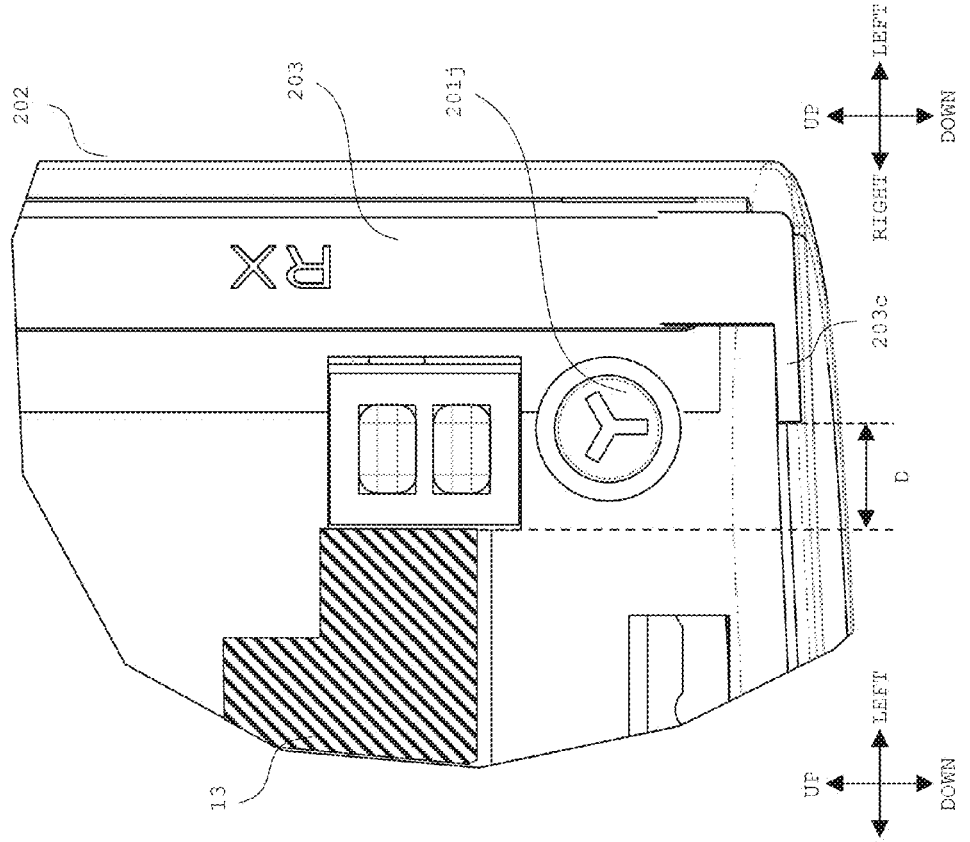
FIGS. 8A and 8B are diagrams illustrating the configuration of the mobile phone.
Figure 8A:
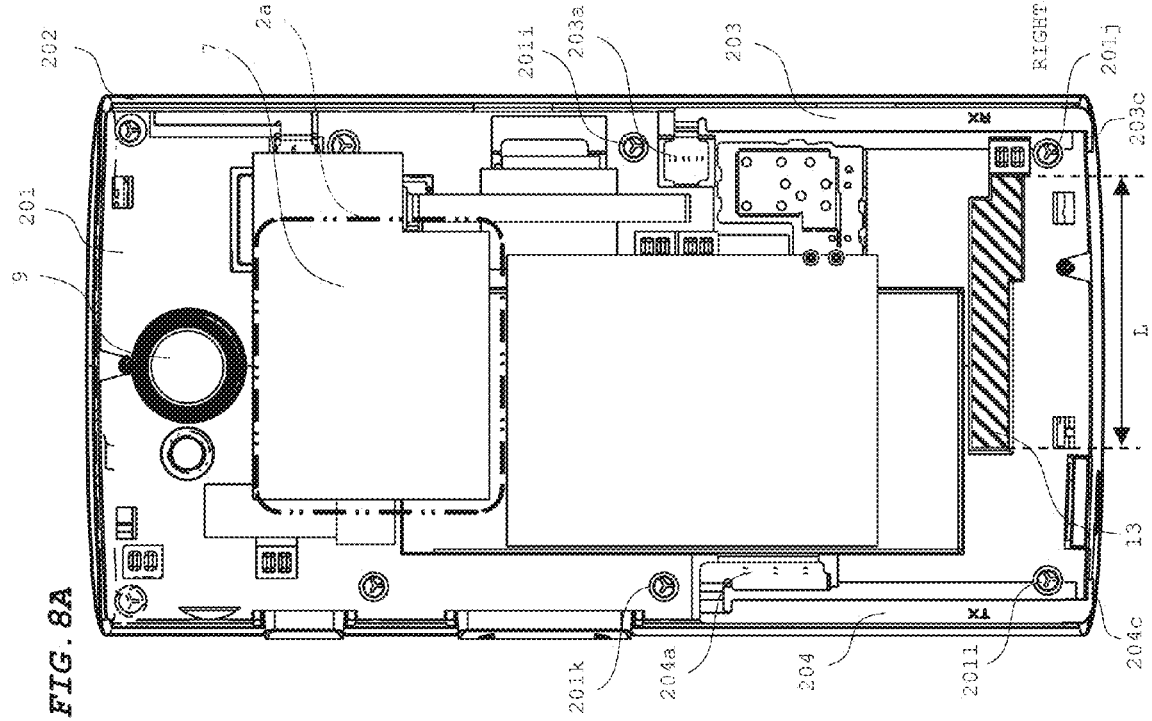

FIG. 8A is a rear view of the mobile phone 1 in which the cover 202 is seen through. FIG. 8B is a partial enlarged view the lower left end portion and its periphery of the mobile phone 1.

In this modification example, the bended portions 203c and 204c of the FPCs 203 and 204 are disposed so as not to overlap the range of a longer side L of the radio wave transmission/reception antenna 13. That is, a predetermined spacing D exists between the left end portion of the radio wave transmission/reception antenna 13 and the bended portion 203c of the FPC 203. Similarly, a predetermined spacing exists between the right end portion of the radio wave transmission/reception antenna 13 and the bended portion 204c of the FPC 204. This suppresses influence of the radio wave transmission antenna 10 and the electric field detection antenna 11 on the radio wave transmission/reception antenna 13.

According to this modification example described above, it is possible to improve the mobile phone 1 in sensitivity of detection of the users grip without deteriorating transmission/reception power of radio waves for communications.

The shapes and layouts of the radio wave transmission antenna 10 and the electric field detection antenna 11 in both the present embodiment and its modification example are merely examples. The shapes and layouts of the radio wave transmission antenna 10 and the electric field detection antenna 11 may be modified in other various manners.

Figure 9A:
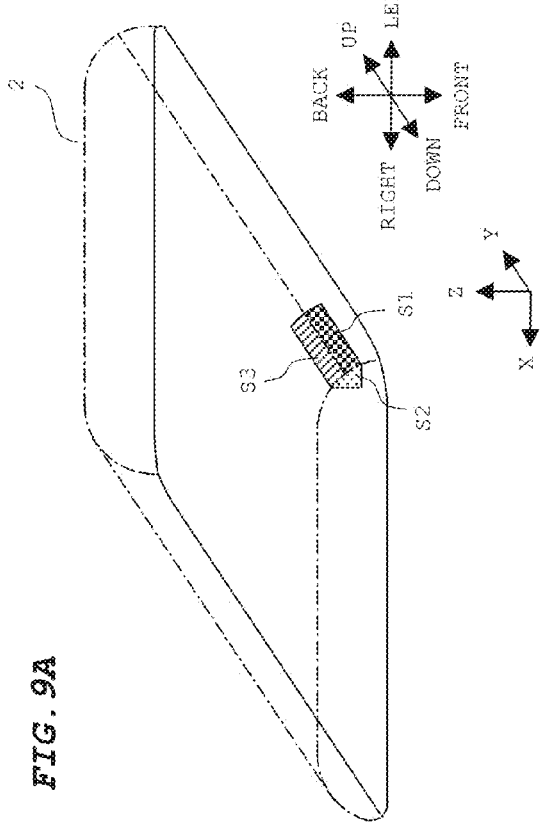
FIGS. 9A to 9C are diagrams illustrating the configuration of the mobile phone in the modification example.
Figure 9B:
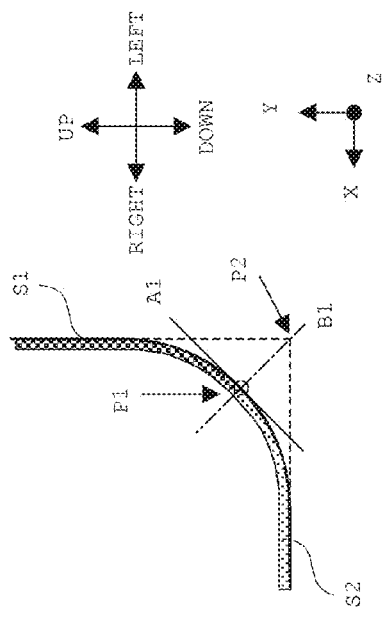
Figure 9C:
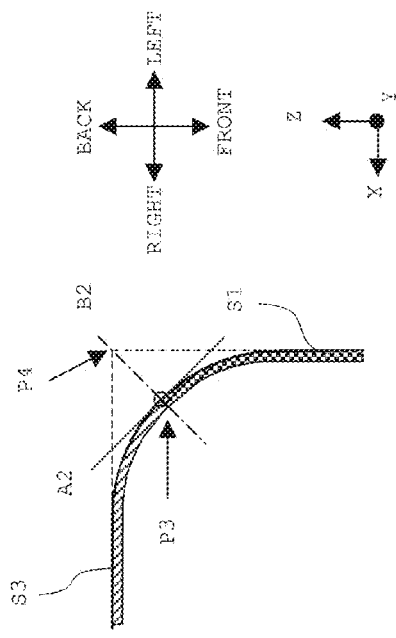

FIG. 9A is a schematic view of an outer shape of the housing 2. FIGS. 9B and 9C are diagrams describing boundary positions in the curved surfaces of the housing 2. In FIGS. 9A to 9C, X, Y, and Z axes are shown with upward, downward, rightward, and leftward directions. The rightward direction is equivalent to a positive X-axis direction, the upward direction is equivalent to a positive Y-axis direction, and the backward direction is equivalent to a positive Z-axis direction.

In the housing 2, the corners of an XY plane and an XZ plane are curved. For the sake of description of an arrangement example of the radio wave transmission antenna 10 and the electric field detection antenna 11, the side surface of the housing 2, on which the radio wave transmission antenna 10 or the electric field detection antenna 11 is disposed, will be hereinafter referred to as S1, the bottom surface of the housing 2 as S2, and the back surface of the housing 2 as S3.

As illustrated in FIG. 9B, the boundary between the side surface S1 and the bottom surface S2 in the XY plane is set at a point P1 of intersection between the curved surface and a perpendicular B1 to a tangent A1 to the curved surface, the perpendicular B1 passing through a point P2 of intersection between an extended line of the housing 2 in the X-axis direction and an extended line of the housing 2 in the Y-axis direction.

In addition, as illustrated in FIG. 9C, the boundary between the side surface S1 and the back surface S3 in the XZ plane is set at a point P3 of intersection between the curved surface and a perpendicular B2 to a tangent A2 to the curved surface, the perpendicular B2 passing through a point P4 of intersection between an extended line of the housing 2 in the X-axis direction and an extended line of the housing 2 in the Z-axis direction.

As described above, the radio wave transmission antenna 10 or the electric field detection antenna 11 is desirably disposed at least to include the curved side surface S1 of the housing 2.

In addition, the radio wave transmission antenna 10 and/or the electric field detection antenna 11 is desirably disposed at a corner including the side surface S1 of the lower portion with which the users hand is likely to come into contact when gripping the mobile phone 1. They are more desirably disposed to extend over the side surface S1 and the bottom surface S2. In such a case, the bottom surface S2 is desirably disposed so as not to overlap the longer side L of the radio wave transmission/reception antenna 13 as illustrated in FIG. 8A.

In addition, when the user grips the mobile phone 1 with the right hand, the palm of the right hand is also likely to come into contact with the back surface of the cover 202 as illustrated in FIG. 6A. Therefore, from the viewpoint of enhancing sensitivity for detection of the users grip, the radio wave transmission antenna 10 and the electric field detection antenna 11 are desirably disposed to cover the side surface S1 and the back surface S3, or the side surface S1, the bottom surface S2, and the back surface S3. In this case, the back surface S3 is further desirably disposed at the predetermined spacing C from the bottom surface 202a of the cover 202 as illustrated in FIG. 5B to suppress false or wrong detection of the users grip at placement of the mobile phone 1.

As far as any of the foregoing conditions is met, the radio wave transmission antenna 10 and the electric field detection antenna 11 may be modified as appropriate in terms of arrangement position, size, shape, and the like.

For example, in both the above embodiment and the modification example, the radio wave transmission antenna 10 and the electric field detection antenna 11 are stuck to the cover 202. Alternatively, the radio wave transmission antenna 10 and the electric field detection antenna 11 may be stuck to the main body module 201.

In addition, the radio wave transmission antenna 10 and the electric field detection antenna 11 are disposed at the lower portion of the mobile phone 1. Alternatively, the radio wave transmission antenna 10 and the electric field detection antenna 11 may be disposed to reach up to the upper portion of the mobile phone 1.

Further, in both the above embodiment and the modification example, the radio wave transmission antenna 10 is disposed at the right side for right-handed users. Alternatively, the radio wave transmission antenna 10 may be disposed at the left side for left-handed users.

Furthermore, in the present embodiment and the modification example, the radio wave transmission antenna 10 and the electric field detection antenna 11 are disposed on the curved surfaces 202b and 202c of the cover 202, respectively. Alternatively, only either the radio wave transmission antenna 10 or the electric field detection antenna 11 may be disposed on the curved surface 202*b* (or 202*c*).

Moreover, the radio wave transmission antenna 10 and the electric field detection antenna 11 are used as the grip detection module 26. Alternatively, any other sensors may be used instead. For example, capacitance sensors pressure-type sensors, heat-detection type sensors, or the like may be used instead. Various sensors capable of being disposed on the curved side surface S1 of the housing 2 may also be used instead.

<Control Processes>

The control processes using the grip detection module 26 will now be described. In one embodiment, upon receipt of an incoming call, control processes of various functions are performed based on detection signals from the grip detection module 26 and the proximity detection module 27.

FIGS. 10 to 12 are flowcharts of an incoming call control process. The incoming call process described in FIGS. 10 to 12 is executed when the communication module 33 gets an incoming call from another device.

Figure 14:
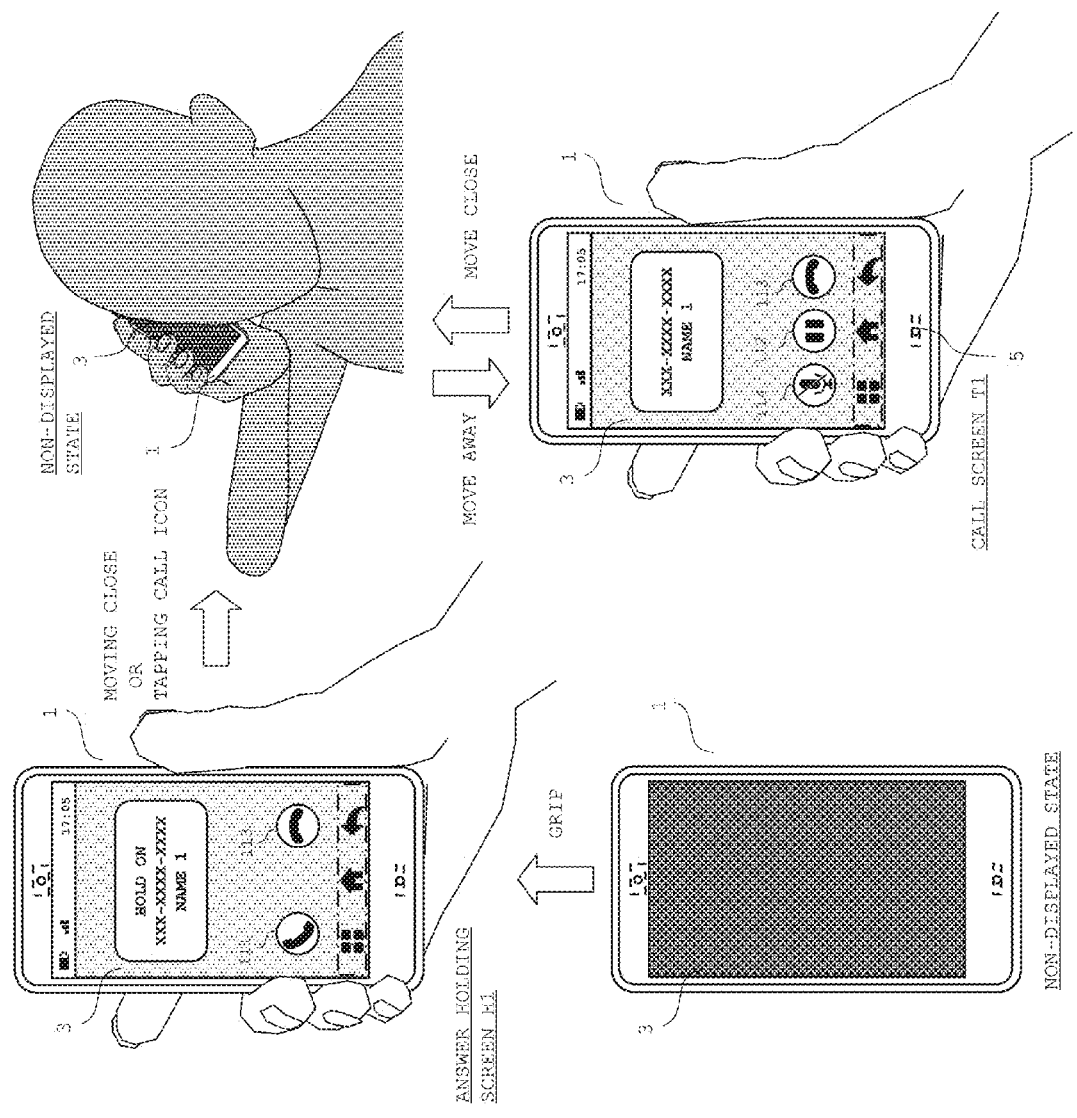
FIG. 14 is a diagram illustrating a screen display example of the display of the mobile phone.

FIGS. 13 and 14 are diagrams illustrating screen display examples of the display 3 of the mobile phone 1 under incoming control.

Referring to FIG. 10, when the communication module 33 gets an incoming call from another device, the control module 21 first starts the proximity detection module 27 (S101). Accordingly, the radio wave transmission antenna 10 transmits weak radio waves at the second periodic timing different from the first periodic timing of the grip detection module 26. The grip detection module 26 is already activated at the start of the mobile phone 1. The radio wave transmission antenna 10 transmits weak radio waves at the first periodic timing.

After the proximity detection module 27 is activated, the control module 21 determines whether a setting for notification of an incoming call by a ringtone or a vibrating alert is enabled (S102). The enabling or disabling of the setting for notification by a ringtone or a vibrating alert is selected in advance by the user through a settings application or the like.

In the case where the setting for notification by a ringtone or a vibrating alert is enabled (S102: YES), when the incoming call from another device has been detected, the control module 21 starts to make the ringtone or the vibrating alert based on the setting (S103). The control module 21 determines whether a setting for display of an incoming call screen immediately after arrival of an incoming call is enabled (S104). The enabling or disabling of the setting for display of the incoming call screen immediately after arrival of an incoming call is selected in advance by the user through a settings application or the like.

In the case where no setting for display of the incoming call screen immediately after arrival of an incoming call is enabled (S104: NO), the control module 21 determines whether the grip detection module 26 has detected the users grip of the mobile phone 1 while the display 3 is in non-display state as illustrated in the upper left part of FIG. 13 (S105). Specifically, the control module 21 determines whether an electric field generated by radio waves transmitted from the radio wave transmission antenna 10 of the grip detection module 26 has been detected by the electric field detection antenna 11. The non-display state of the display 3 may include the state in which the backlight of the display 3 is turned off. The non-display state of the display 3 may also include the state in which no image is displayed on the display 3 and the state in which no information is displayed on the display 3. In this example, bringing the display 3 into a non-displayed state may be referred to as terminating display on the display 3.

When the grip detection module 26 has not detected the users grip (S105: NO) and the incoming call is not disconnected (S106: NO), the control module 21 returns the process to S105 and repeats the process until the users grip is detected. When the incoming call from another device has been discontinued (S106: YES), the control module 21 moves the process to S124 described in FIG. 11 to stop the proximity detection module 27 and terminates the incoming call control process.

When the grip detection module 26 has detected the users grip (S105: YES), the control module 21 stops the ringtone and the vibrating alert (S107). Then, the control module 21 displays an incoming call screen R1 on the display 3 (S108). Accordingly, as illustrated in the upper central part of FIG. 13, the incoming call screen R1 is displayed on the display 3 with the ringtone and the vibrating alert stopped.

The incoming call screen R1 provides a message notifying an incoming call, the callers phone number, the name corresponding to the phone number registered in the storage module 22, and others. The incoming call screen R1 includes an answer icon 111, a hold icon 112, and a disconnect icon 113. The answer icon 111 is assigned with a function of answering incoming calls. The hold icon 112 is assigned with a function of answering the incoming call and notifying the caller that the user currently cannot take the call by sound, music, or the like. The disconnect icon 113 is assigned with a function of disconnecting the call.

Returning to FIG. 10, after displaying the incoming call screen R1 on the display 3, the control module 21 moves the process to S113 described in FIG. 11.

When none of the settings for notification by a ringtone and a vibrating alert is enabled (S102: NO), the user cannot recognize the incoming call. Thus, the control module 21 displays the incoming call screen R1 on the display 3 as illustrated in the lower left part of FIG. 13 (S109).

Similarly, when the setting for display of the incoming call screen immediately after arrival of an incoming call is enabled (S104: YES), the control module 21 displays the incoming call screen R1 on the display 3 as illustrated in the lower left part of FIG. 13 (S109).

Then, the control module 21 determines whether the grip detection module 26 has detected the users grip while the incoming call screen R1 is displayed on the display 3 (S110).

When the grip detection module 26 has not detected the users grip (S110: NO) and the incoming call is not disconnected (S111: NO), the control module 21 returns the process to S110 and repeats the process until the users grip is detected. When the incoming call from another device has been discontinued (S111: YES), the control module 21 moves the process to S124 described in FIG. 11 to stop the proximity detection module 27 and terminates the incoming call control process.

When the grip detection module 26 has detected the users grip (S110: YES), the control module 21 stops the ringtone and the vibrating alert (S112). Accordingly, the incoming call screen R1 is displayed on the display 3 with the ringtone and the vibrating alert stopped, as illustrated in the upper central part of FIG. 13.

When the incoming call screen R1 is displayed on the display 3, the control module 21 moves the process to S113 described in FIG. 11.

Referring to FIG. 11, the control module 21 determines whether the grip detection module 26 has detected that the user released the mobile phone 1 (S113). Specifically, the control module 21 determines whether the electric field generated by radio waves transmitted from the radio wave transmission antenna 10 of the grip detection module 26 has not been detected any longer by the electric field detection antenna 11.

When the grip detection module 26 has not detected that the user released the mobile phone 1 (S113: NO), that is, when the user is still gripping the mobile phone 1, the control module 21 determines whether the proximity detection module 27 has detected approach of an object (S114). Specifically, the control module 21 determines whether the electric field generated by radio waves transmitted from the radio wave transmission antenna 10 of the proximity detection module 27 has been detected by the electric field detection antenna 12 disposed in the vicinity of the call speaker 6.

When the proximity detection module 27 has not detected approach of an object (S114: NO), the control module 21 determines whether a tap operation has been performed on the answer icon 111 (S115). When no tap operation has been performed on the answer icon 111 (S115: NO) and the incoming call is not disconnected (S116: NO), the control module 21 returns the process to S113 and repeats the determination at S113 to S115. When the incoming call from another device has been disconnected or a tap operation has been performed on the disconnect icon 113 (S116: YES), the control module 21 moves the process to S124 described in FIG. 11 to stop the proximity detection module 27 and terminate the incoming call control process.

When the grip detection module 26 has detected that the user released the mobile phone 1 (S113: YES), the control module 21 brings the display 3 into a non-displayed state (S117) and sets the mobile phone 1 in an answer holding state (S118), as illustrated in the lower central part of FIG. 13. Specifically, the control module 21 answers the incoming call and notifies the caller that the user currently cannot take the call by sound, music, or the like.

Then, the control module 21 determines whether the grip detection module 26 has detected the users grip while the display 3 is in the non-displayed state (S119).

When the grip detection module 26 has not detected the users grip (S119: NO) and the incoming call is not disconnected (S120: NO), the control module 21 returns the process to S119 and repeats the process until the users grip is detected. When the incoming call from another device has been discontinued (S120: YES), the control module 21 moves the process to S124 described in FIG. 11 to stop the proximity detection module 27 and terminates the incoming call control process.

When the grip detection module 26 has detected the users grip (S119: YES), the control module 21 displays an answer holding screen H1 on the display 3 (S121). Accordingly, the answer holding screen H1 is displayed on the display 3 with the ringtone and the vibrating alert stopped, as illustrated in the upper central part of FIG. 14.

The answer holding screen H1 shows a message notifying an answer holding state, the callers phone number, the name corresponding to the phone number registered in the storage module 22, and others. The answer holding screen H1 includes the answer icon 111 and the disconnect icon 113.

When the proximity detection module 27 has detected approach of an object (S114: YES) or when a tap operation has been performed on the answer icon 111 (S115: YES), the control module 21 brings the display 3 into the non-displayed state (S122) as illustrated in the upper right part of FIG. 13, and executes a call process (S123).

FIG. 12 is a flowchart of a call control process.

Referring to FIG. 12, the control module 21 first executes a call start process (S201). When the mobile phone 1 is not in the answer holding state, the call start process includes establishment of a connection with the phone of the communication partner, processing of input/output of received sound, and the like, for example. When the mobile phone 1 is in the answer holding state, the call start process includes cancelling of the answer holding state, processing of input/output of received sound, and the like, for example.

The control module 21 determines whether the proximity detection module 27 has detected separation of an object (S202). Specifically, the control module 21 determines whether the electric field generated by radio waves transmitted from the radio wave transmission antenna 10 of the proximity detection module 27 is no longer detected by the electric field detection antenna 12.

When the proximity detection module 27 has not detected separation of an object (S202: NO) and the incoming call is not disconnected (S203: NO), the control module 21 returns the process to S202 and repeats the process until separation of an object is detected. When the incoming call from another device has been disconnected (S203: YES), the control module 21 executes a call end process (S204). The call end process includes disconnection of a communication network with the phone of the communication partner, and the like, for example. Then, the control module 21 moves the process to S124 described in FIG. 11 to stop the proximity detection module 27 and terminate the incoming call control process.

When the proximity detection module 27 has detected separation of an object (S202: YES), the control module 21 displays a call screen T1 on the display 3 (S205). Accordingly, the call screen T1 is displayed on the display 3 as illustrated in the lower right part of FIG. 13.

The call screen T1 provides the callers phone number, the name corresponding to the phone number registered in the storage module 22, and others. The call screen T1 includes the hold icon 112, the disconnect icon 113, a mute icon 114. The mute icon 114 is assigned with a function of shutting off sound input into the microphone 5. When a tap operation has been performed on the mute icon 114, the function of shutting off sound input into the microphone 5 is enabled and the mute icon 114 is displayed in a highlighted manner. In that state, when a tap operation has been further performed on the mute icon 114, the function of shutting off sound input into the microphone 5 is disabled the highlighting of the mute icon 114 is canceled. Shutting off sound input means stopping transmission of the users sound to the mobile phone of the communication partner via the communication module 33. For example, the control module 21 may shut off sound input by stopping power supply to the sound input module 28, the microphone 5, and the like and stopping input into the microphone 5. Alternatively, the control module 21 may shut off sound input by stopping output of sound received by the microphone 5 to the communication module 33. The control module 21 may shut off sound input by stopping a process of transmitting sound received by the microphone 5 via the communication module 33. Returning to FIG. 12, after displaying the call screen T1 on the display 3, the control module 21 determines whether the proximity detection module 27 has detected approach of an object (S206).

When the proximity detection module 27 has not detected approach of an object (S206: NO) and the incoming call is not disconnected (S207: NO), the control module 21 returns the process to S206 and repeats the process until approach of an object is detected. When the incoming call from another device is disconnected or when a tap operation has been performed on the disconnect icon 113 (S207: YES), the control module 21 executes a call end process (S204). Then, the control module 21 moves the process to S124 described in FIG. 11 to stop the proximity detection module 27 and terminate the incoming call control process.

When the proximity detection module 27 has detected approach of an object (S206: YES), the control module 21 brings the display 3 into the non-displayed state (S208) as illustrated in the upper right part of FIG. 13, and returns the process to S202. After that, the control module 21 repeats a call process while detecting whether an object is in proximity until the incoming call is disconnected (S203: YES, S207: YES).

When the call is ended and the communication network is disconnected (S203: YES, S207: YES), the control module 21 executes a call end process (S204). Then, the control module 21 moves the process to S124 described in FIG. 1 to stop the proximity detection module 27 and terminate the incoming call control process.

As in the foregoing, according to the above embodiment, a call process is automatically started only when the user grips the mobile phone 1 and brings the mobile phone 1 close to the ear, which allows the user to start a call in a smooth manner.

When the user grips the mobile phone 1 and then releases the mobile phone 1, the mobile phone 1 is automatically brought into an answer holding state, which allows the user to perform an answer holding process in a smooth manner.

Further, according to this embodiment, when the user grips the mobile phone 1 and then releases the mobile phone 1, the display 3 is automatically brought into the non-displayed state, which realizes reduction of power consumption.

According to this embodiment, when the user does not grip the mobile phone 1 immediately after getting an incoming call, the display 3 can be brought into the non-displayed state. This makes it possible to prevent information about the caller, such as caller's phone number and name, from being observed by a third party. In addition, when the setting for notification by a ringtone and a vibrating alert is enabled to allow the user to recognize an incoming call, the display 3 can be in the non-displayed state, which provides an effect of suppressing power consumption.

When the user moves the mobile phone 1 close to the ear while gripping the mobile phone 1, the display 3 is brought into the non-displayed state, which provides an effect of further reducing power consumption.

When the user grips the mobile phone 1, the notification by a ringtone and a vibrating alert or the like is automatically stopped. This makes it possible to prevent, when the user moves the mobile phone 1 close to the ear to start communication, the ringtone is emitted at a close range of the ear. In addition, in situations where no ringtone or vibrating alert is desired such as on a train or in a meeting room, the user can stop the ringtone and the vibrating alert only by gripping the mobile phone 1 without disconnecting the incoming call.

The grip detection module 26 and the proximity detection module 27 are provided to allow correct determination on whether the user is in a situation where he/she is in a communicable state. For example, in the case where the control module 21 does not determine whether the grip detection module 26 has detected the users grip, when the user holds the mobile phone 1 near the radio wave transmission antenna 10 and the electric field detection antenna 12 with the hand, the control module 21 wrongly detects that the user is in a communicable state and executes the call process (S123) despite the actual state that the user is not yet prepared to take the call. In contrast, according to this embodiment, the grip detection module 26 first detects the users grip, and then the proximity detection module 27 detect whether the user has brought the mobile phone 1 close to the ear. This makes it possible to determine correctly whether the user is prepared to take the call.

When the user grips the mobile phone 1, the incoming call screen R1 is automatically displayed on the display 3, which saves the user from having to press a button or the like for lighting on the display 3. In addition, when the user moves the mobile phone 1 away from the ear, the call screen T1 is automatically displayed on the display 3, which saves the user from having to press the button or the like for lighting on the display 3.

<Modification Example 1 of the Control Process>

In one embodiment, while the user does not grip the mobile phone 1, the display 3 is in the non-displayed state to prevent the information on the caller from being easily disclosed to the third party. Meanwhile, in a modification example 1, an incoming call screen is displayed on the display 3 without the phone number and the name for enhancement of security.

FIG. 15 is a flowchart of an incoming call control process according to the modification example 1. The flowchart of FIG. 15 is partially modified as compared to the flowchart of FIG. 10. FIG. 16 is a diagram illustrating a screen display example of the display 3 of the mobile phone 1 under incoming call control according to the modification example 1.

Referring to FIG. 15, the control module 21 starts to emit the ringtone and the vibrating alert base on the setting (S103), and determines whether a security setting is enabled to the incoming call screen immediately after arrival of an incoming call (S301). The enabling or disabling of the security setting is selected in advance by the user using a settings application or the like.

When the security setting is enabled to the incoming call screen immediately after arrival of an incoming call (S301: YES), the control module 21 displays an incoming call screen R2 on the display 3 as illustrated in the upper left part of FIG. 16 (S302). When no security setting is enabled to the incoming call screen immediately after arrival of an incoming call (S301: NO), the control module 21 displays the incoming call screen R1 on the display 3 as illustrated in the lower left part of FIG. 16 (S109).

The incoming call screen R2 shows only a message notifying the incoming call and does not provide the callers phone number or the name corresponding to the phone number registered in the storage module 22, or the like.

When the grip detection module 26 has detected the users grip (S105: YES), the control module 21 stops the ringtone and the vibrating alert (S107). Then, the control module 21 displays the incoming call screen R1 on the display 3 (S108). Accordingly, as illustrated in the upper central part of FIG. 16, the incoming call screen R1 is displayed on the display 3 with the ringtone and the vibrating alert stopped.

According to the configuration of this modification example, when the user does not grip the mobile phone 1 immediately after arrival of an incoming call, no phone number, name, or the like is displayed on the display 3, which prevents information on the caller from being observed by a third party.

According to the configuration of this modification example, it is possible to notify the user of an incoming call with enhancement of security even in situation where no setting for the ringtone or the vibrating alert can be enabled.

<Modification Example 2 of the Control Process>

In a modification example 2, beside the control process in an embodiment, a control process of automatically muting the microphone 5 according to proximity detection is executed.

FIG. 17 is a flowchart of a call control process according to the modification example 2. In the flowchart of FIG. 17, some steps are added to the flowchart of FIG. 12. FIG. 18 is a diagram illustrating a screen display example of the display 3 of the mobile phone 1 in the modification example 2.

Referring to FIG. 17, when the proximity detection module 27 has detected separation of an object (S202: YES), the control module 21 determines whether a mute setting is enabled (S501). The enabling or disabling of the mute setting is selected in advance by the user using a settings application or the like.

When the mute setting is enabled (S501: YES), the control module 21 shuts off sound input into the microphone 5 (S502). Then, the control module 21 displays the call screen T1 with highlighting of the mute icon 114 on the display 3 as illustrated in the lower right part of FIG. 18 (S205). When a tap operation has been performed on the mute icon 114 by the user, the control module 21 cancels the shutoff of sound input into the microphone 5.

When no mute setting is enabled (S501: NO), the control module 21 does not shut off sound input into the microphone 5 but displays on the display 3 the call screen T1 with no highlighting of the mute icon 114 as illustrated in the lower right part of FIG. 18 (S205).

Returning to FIG. 17, after displaying the call screen T1 on the display 3, the control module 21 determines whether the proximity detection module 27 has detected approach of an object (S206).

When the proximity detection module 27 has detected approach of an object (S206: YES), the control module 21 determines whether sound input into the microphone 5 is shut off (S503).

When sound input into the microphone 5 is shut off (S503: YES), the control module 21 cancels the shutoff of sound input into the microphone 5 (S504). After that, the control module 21 brings the display 3 into the non-displayed state (S208), and returns the process to S202.

When sound input into the microphone 5 is not shut off (S503: NO), the control module 21 brings the display 3 into the non-displayed state as illustrated in the upper right part of FIG. 18 (S208), and returns the process to S202.

After that, the control module 21 repeats the call process while detecting whether an object is in proximity until the incoming call is disconnected (S203: YES, S207: YES).

According to the configuration of this modification example, when the user moves the mobile phone 1 away from the ear during a call, sound input into the microphone 5 is automatically shut off, which saves the user from having to perform a tap operation on the mute icon 114 to shut off sound input.

According to the configuration of this modification example, the user can quickly shut off sound input into the microphone 5 during communication by moving the mobile phone 1 away from the ear. Therefore, the user can prevent undesired conversations, sounds, and the like from being transferred to the communication partner.

<Modification Example 3 of the Control Process>

In the modification example 3, besides the control process in an embodiment, a control process for volume adjustment using the back touch panel 7 is executed.

FIGS. 19A and 19B are flowcharts of a call control process in a modification example 3. In the flowchart of FIGS. 19A and 19B, some steps are added to the flowchart of FIG. 12. FIG. 19C is a schematic rear view of the mobile phone 1, and FIG. 19D is a schematic diagram illustrating a situation during a phone conversation.

In the call control process of FIG. 12, when the user has the mobile phone 1 close to the ear (S201, S203: NO), the control module 21 determines whether a flick operation has been performed on the back touch panel 7 (S601). When a flick operation has been performed on the back touch panel 7 (S601: YES), the control module 21 adjusts the volume of the call speaker 6 according to the flick operation (S602).

Similarly, when the user does not have the mobile phone 1 close to the ear (S205, S207: NO), the control module 21 determines whether a flick operation has been performed on the back touch panel 7 (S603). When a flick operation has been performed on the back touch panel 7 (S603: YES), the control module 21 adjusts the volume of the call speaker 6 according to the flick operation (S604).

As illustrated in FIG. 19C, for example, when an upward flick operation has been performed on the back touch panel 7, the control module 21 increases the volume of the call speaker 6, and when a downward flick operation has been performed on the back touch panel 7, the control module 21 decreases the volume of the call speaker 6.

According to the configuration of this modification example, the volume of the call speaker 6 can be adjusted by a flick operation on the back touch panel 7. Therefore, as illustrated in FIG. 19D, the user can easily adjust the volume of the call speaker 6 even with the mobile phone 1 close to his/her ear.

In this modification example, when an upward or downward flick operation has been performed on the back touch panel 7, the volume of the call speaker 6 is adjusted. In addition, when a rightward or leftward flick operation has been performed on the back touch panel 7, the volume of the microphone 5 may be adjusted. Further, an operation on the back touch panel 7 may be any touch operation other than a flick operation.

<Modification Example 4 of the Control>

The incoming control processes in the case where the user does not grip the mobile phone 1 when getting an incoming call are described. In relation to modification example 4, an incoming call process in the case where the user grips the mobile phone 1 when getting an incoming call will be described below.

Figure 20:
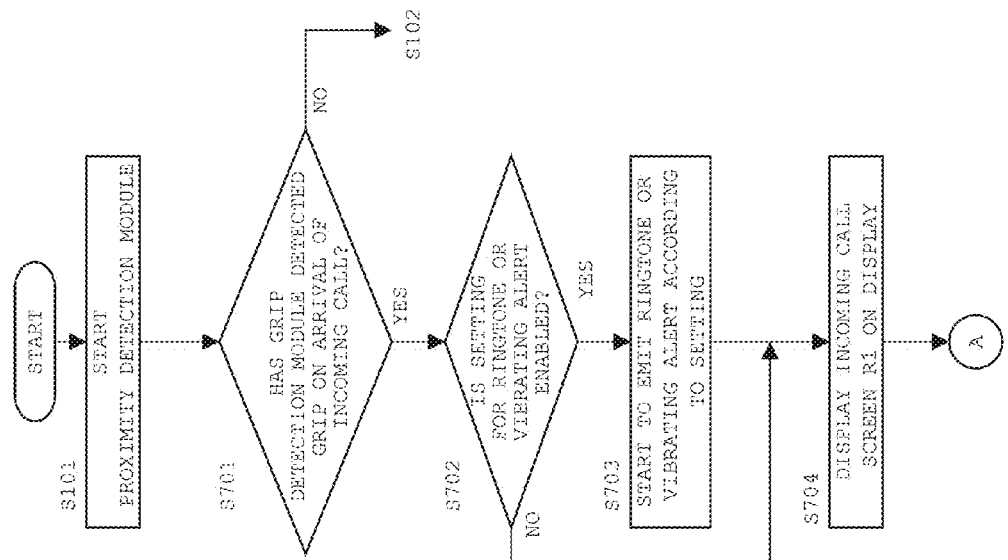
FIG. 20 is a flowchart of an incoming call control process.

FIG. 20 is a flowchart of an incoming call control process in the modification example 4. The flowchart of FIG. 20 is modification of the flowchart of FIG. 10 and FIG. 20 shows some steps including the modified steps. FIG. 21 is a diagram illustrating a screen display example of the display 3 of the mobile phone 1 under incoming call control in the modification example 4.

Referring to FIG. 20, when the communication module 33 has got an incoming call from another device, the control module 21 first starts the proximity detection module 27 (S101). Then, the control module 21 determines whether the grip detection module 26 has detected the users grip of the mobile phone 1 at the time of arrival of the incoming call (S701).

When the grip detection module 26 has not detected the users grip of the mobile phone 1 at the time of arrival of the incoming call (S701: NO), the control module 21 moves the process to S102 described in FIG. 10, and switches between display and non-display states of the display 3 or switches on and off states of the notification process by a ringtone or a vibrating alert, and the like based on the grip state of the mobile phone 1.

When the grip detection module 26 has detected the users grip of the mobile phone 1 at the time of arrival of the incoming call (S701: YES), the control module 21 determines whether the setting for notification by a ringtone or a vibrating alert is enabled (S702).

The setting for notification by a ringtone or a vibrating alert is enabled (S702: YES), the control module 21 starts to emit the ringtone and the vibrating alert based on the setting (S703). The control module 21 displays the incoming call screen R1 on the display 3 (S704). Accordingly, the incoming call screen R1 is displayed on the display 3 with emission of the ringtone and the vibrating alert as illustrated in the upper left part of FIG. 21.

When no setting for notification by a ringtone or a vibrating alert is enabled (S702: NO), the control module 21 displays the incoming call screen R1 on the display 3 (S704).

After that the control module 21 moves the process to S113 described in FIG. 11 and executes the process for call answering, answer holding, or the like, according to the state of the detection by the grip detection module 26 and the state of the detection by the proximity detection module 27, as in an embodiment.

According to the configuration of this modification example, in a situation where the user grips and operates the mobile phone 1, the display 3 is not brought into the non-displayed state and the notification of an incoming call by a ringtone or a vibrating alert is not disabled. This allows the user to know correctly the arrival of an incoming call during operation of the mobile phone 1.

In the foregoing example, the ringtone and the vibrating alert is stopped only when the user answers an incoming call by bringing the mobile phone 1 close to the ear or operating the answer icon 111. However, after lapse of a predetermined period of time (the time long enough for the user to recognize the incoming call, for example, several seconds) after arrival of an incoming call, the ringtone or the like may be automatically stopped. It is possible to prevent the ringtone from being emitted at close range of the ear by bringing the mobile phone close to the ear after stoppage of the ring tone or the like.

<Others>

As in the foregoing, an embodiment and potential modification examples are described. However, the disclosure is not limited to the above, and it may be further modified in various manners other than those described above within the scope of technical ideas described.

For example, in the above description, the incoming call control process is continued until the incoming call is disconnected. Alternatively, after lapse of a predetermined period of time, an automatic answering function may be executed. In this case, the control module 21 starts a time measurement process at a timing for start of the incoming call process, and after lapse of the predetermined period of time, executes the automatic answering function.

The disclosure is not limited to the mobile phone but is also applicable to various mobile terminal devices such as personal digital assistants (PDAs), tablets, and electronic book terminals. One or more of the functions described in this document may be performed by an appropriately configured module, part or unit. The terms "module," "part" or "unit" as used herein, individually or collectively refer to hardware, firmware, software and any associated hardware that executes the software, or any combination of these elements for performing the associated functions described herein. Additionally, various modules, parts or units can be discrete modules, parts or units. As would be apparent to one of ordinary skill in the art, however, two or more modules, parts or units may be combined to form a single module, part or unit, respectively, that performs the associated functions according to various embodiments of the disclosure. Conversely, a single module, part or unit may be divided into two or more modules, parts or units, respectively, that perform respective associated functions according to various embodiments of the disclosure.

What is claimed is:

1. A mobile terminal device, comprising:
    a display;
    a receiver configured to receive an incoming call from a caller;
    a sound input configured to receive sound from a user;
    a sound output configured to output sound of the call;
    a hold detector configured to detect when the mobile terminal device is being held; and
    at least one processor configured to, in a case in which the receiver receives an incoming call, when the hold detector detects that the mobile terminal device is held and then the mobile terminal device is subsequently no longer held, perform a process of notifying the caller that the user cannot take the call.

2. The mobile terminal device according to claim 1, wherein the at least one processor is further configured to:
    when the hold detector detects that the mobile terminal device is not being held upon arrival of the incoming call, bring the display into a non-displayed state; and,
    after that, when the hold detector detects that the mobile terminal device is held, bring the display into a displayed state.

3. The mobile terminal device according to claim 1, wherein the at least one processor is further configured to:
    when the hold detector detects that the mobile terminal device is not being held upon arrival of the incoming call, cause the display to display a first incoming call screen that does not identify the caller; and,
    after that, when the hold detector detects that the mobile terminal device is held, cause the display to display a second incoming call screen that identifies the caller.

4. The mobile terminal device according to claim 1, wherein the at least one processor is further configured to:
    when the hold detector detects that the mobile terminal device is not being held upon arrival of the incoming call, start notification of the arrival of the incoming call; and,
    after that, when the hold detector detects that the mobile terminal device is held, stop the notification.

5. The mobile terminal device according to claim 1, further comprising a casing with a front surface, a back surface, and a plurality of side surfaces,
    wherein
    the display is provided on the front surface of the casing,
    a corner portion of the casing is formed as a curved surface by the back surface and a first side surface, and
    the hold detector is disposed at the corner portion.

6. The mobile terminal device according to claim 5, wherein
    the casing has a left side surface, a right side surface, an upper side surface, and a lower side surface, and the hold detector is disposed at the corner portion at the end of the lower side surface side of at least one of the right side surface and the left side surface.

7. The mobile terminal device according to claim 5, wherein
the hold detector is disposed to extend over the first side surface and a second side surface connected to the first side surface of the casing,
a radio wave transmission/reception antenna configured to transmit and receive radio waves is disposed on the second side surface side of the casing, and
the hold detector is disposed within a range of the second side surface not overlapping the radio wave transmission/reception antenna in a direction vertical to the second side surface.

8. The mobile terminal device according to claim 5, wherein the hold detector is disposed at the corner portion at a predetermined spacing from a flat surface connected to the corner portion on the back surface in a direction vertical to the flat surface.

9. The mobile terminal device according to claim 5, wherein
the casing includes a container configured to contain the display and a cover configured to protect the container from the outside,
the hold detector includes a first antenna configured to transmit radio waves and a second antenna configured to detect an electric field generated by the radio waves transmitted from the first antenna, and
the first antenna and the second antenna are stuck to the cover.

10. The mobile terminal device according to claim 1, further comprising a proximity detector configured to detect when the user moves the mobile terminal device close to the user, wherein the at least one processor is further configured to, in the case in which the receiver receives the incoming call, when the hold detector detects that the mobile terminal device is being held and the proximity detector detects that the user has moved the mobile terminal device close to the user, answer the incoming call and execute a call process.

11. The mobile terminal device according to claim 10, wherein the at least one processor is further configured to:
when the hold detector detects that the mobile terminal device is being held and the proximity detector detects that the user has moved the mobile terminal device close to the user, bring the display into a non-displayed state; and,
when the proximity detector detects that the user moves the mobile terminal device away from the user while the display is in the non-displayed state, bring the display into a displayed state.

12. The mobile terminal device according to claim 10, wherein
the the receiver comprises a transceiver configured to transmit sound received by the sound input to the caller, and
the at least one processor is further configured to, after start of the call,
when the proximity detector detects that the user moves the mobile terminal device away from the user, stop transmission of the sound received by the sound input, and
when the proximity detector detects that the user moves the mobile terminal device close to the user while the transmission of the sound is stopped, restart the transmission of the sound.

13. The mobile terminal device according to claim 10, wherein, when the hold detection module does not detect that the mobile terminal device is held upon arrival of the incoming call, the control module brings the display module into the non-displayed state, and after that, when the hold detection module detects that the mobile terminal device is held, the control module brings the display module into the displayed state.

14. The mobile terminal device according to claim 10, wherein the at least one processor is further configured to:
when the hold detector detects that the mobile terminal device is not being held upon arrival of the incoming call, cause the display to display a first incoming call screen that does not identify the caller; and,
after that, when the hold detector detects that the mobile terminal device is held, cause the display to display a second incoming call screen that identifies the caller.

15. The mobile terminal device according to claim 10, wherein the at least one processor is further configured to:
when the hold detector detects that the mobile terminal device is not being held upon arrival of the incoming call, start notification of the arrival of the incoming call; and,
after that, when the hold detector detects that the mobile terminal device is held, stop the notification.

16. The mobile terminal device according to claim 10, further comprising a casing with a front surface, a back surface, and a plurality of side surfaces,
wherein
the display is provided on the front surface of the casing,
a corner portion of the casing is formed as a curved surface by the back surface and a first side surface, and
the hold detector is disposed at the corner portion.

17. The mobile terminal device according to claim 16, wherein
the casing has a left side surface, a right side surface, an upper side surface, and a lower side surface, and
the hold detector is disposed at the corner portion at the end of the lower side surface side of at least one of the right side surface and the left side surface.

18. The mobile terminal device according to claim 16, wherein
the hold detector is disposed to extend over the first side surface and a second side surface connected to the first side surface of the casing,
a radio wave transmission/reception antenna configured to transmit and receive radio waves is disposed on the second side surface side of the casing and
the hold detector is disposed within a range of the second side surface not overlapping the radio wave transmission/reception antenna in a direction vertical to the second side surface.

19. The mobile terminal device according to claim 16, wherein the hold detection module is disposed at the corner portion at a predetermined spacing from a flat surface connected to the corner portion on the back surface in a direction vertical to the flat surface.

20. The mobile terminal device according to claim 16, wherein
the casing includes a container configured to contain the display and a cover configured to protect the container from the outside,
the hold detector includes a first antenna configured to transmit radio waves and a second antenna configured to detect an electric field generated by the radio waves transmitted from the first antenna, and
the first antenna and the second antenna are stuck to the cover.

\* \* \* \* \*